Sept. 20, 1966

H. W. CHRISTENSON ETAL 3,273,344

TRANSMISSION

Filed May 10, 1963

INVENTORS
Howard W. Christenson,
James J. Mooney, Jr. &
Robert H. Schaefer
BY
A. W. Leiter
ATTORNEY

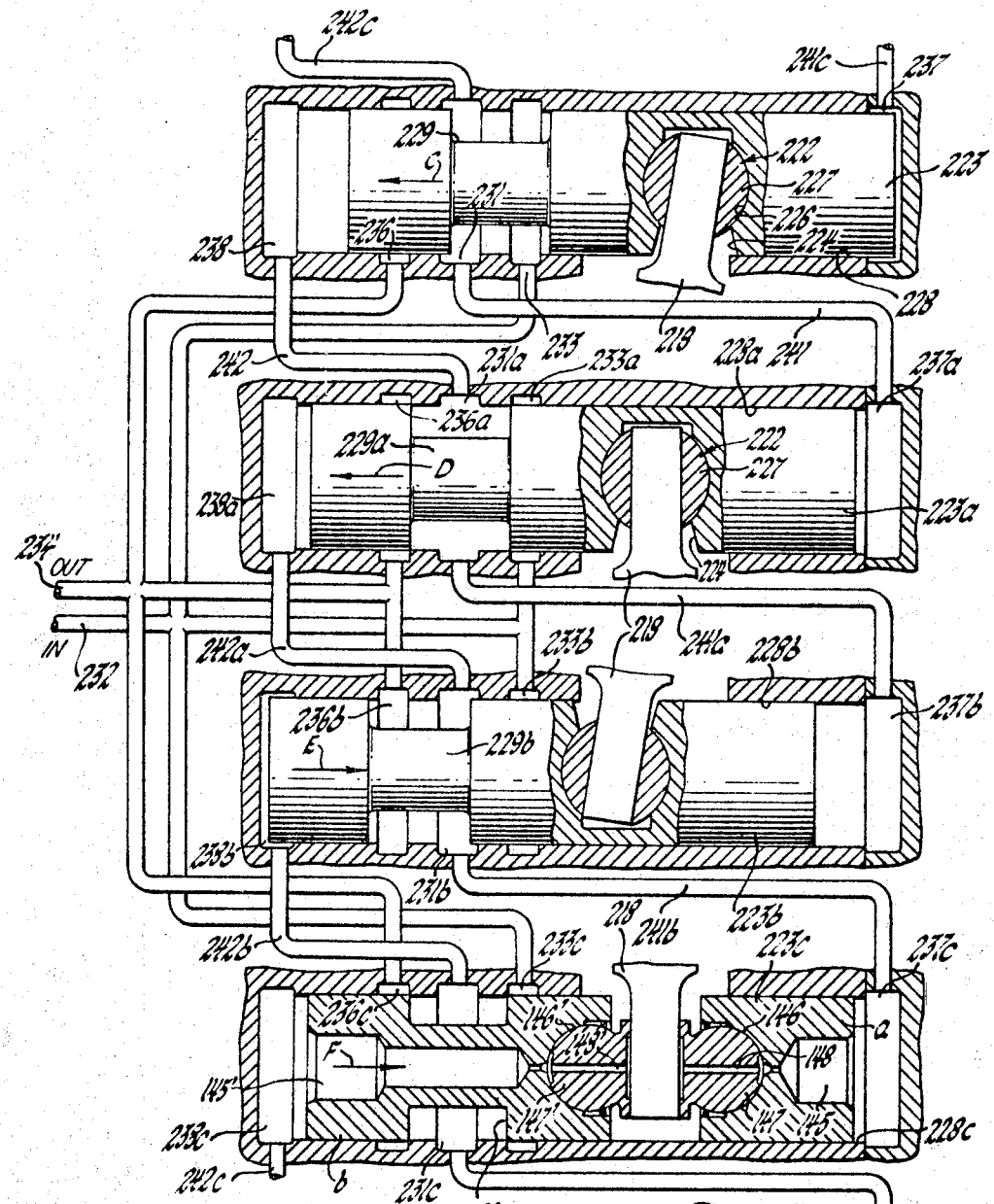

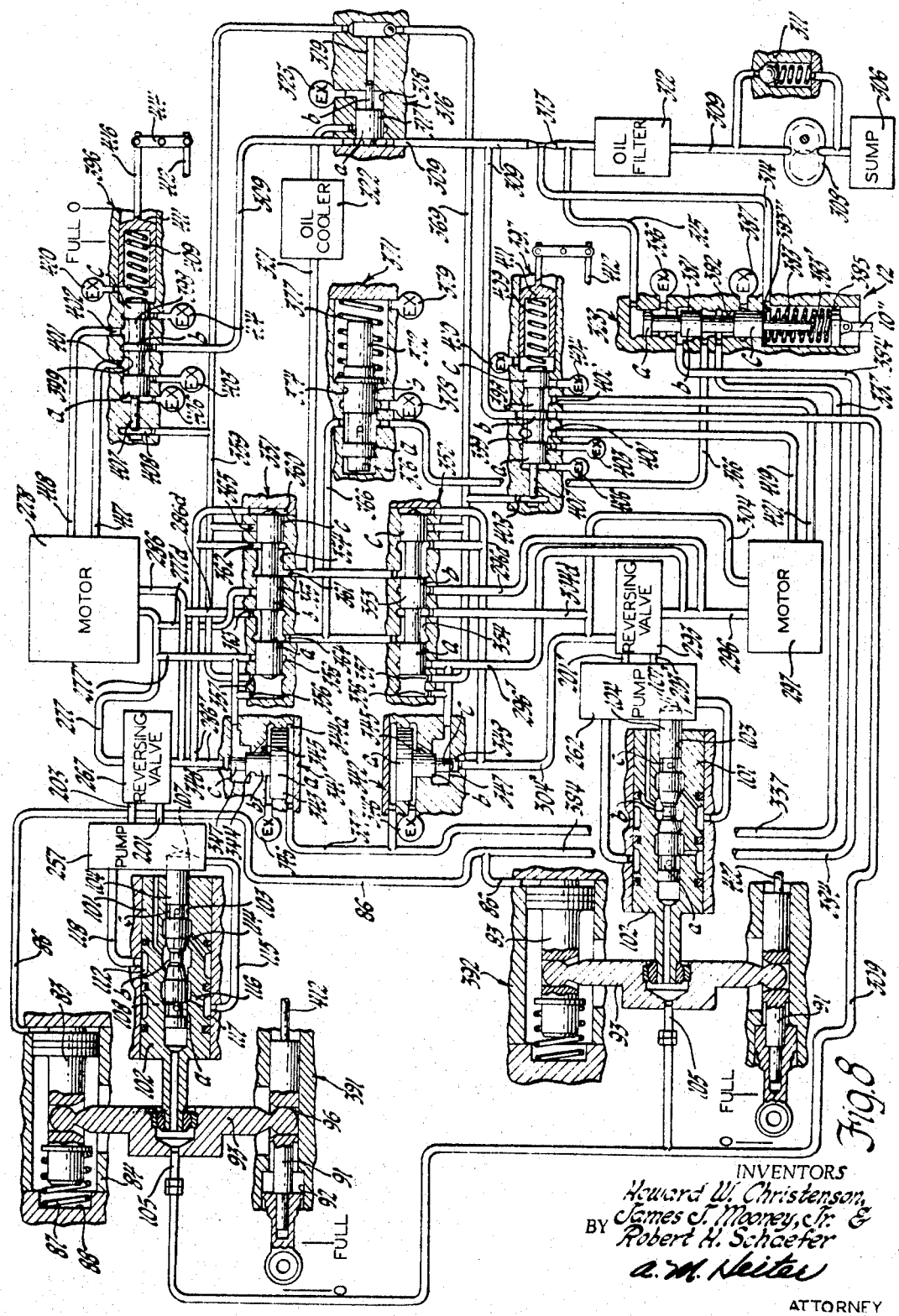

Sept. 20, 1966 H. W. CHRISTENSON ETAL 3,273,344
TRANSMISSION
Filed May 10, 1965 7 Sheets-Sheet 5

INVENTORS
Howard W. Christenson,
BY James J. Mooney, Jr. &
Robert K. Schaefer
*A. W. Neiter*
ATTORNEY Sept. 20, 1966 H. W. CHRISTENSON ETAL 3,273,344
TRANSMISSION
Filed May 10, 1965 7 Sheets-Sheet 6

INVENTORS
Howard W. Christenson,
BY James J. Mooney, Jr. &
Robert H. Schaefer
a. m. Heiter
ATTORNEY Sept. 20, 1966 H. W. CHRISTENSON ETAL 3,273,344
TRANSMISSION
Filed May 10, 1963 7 Sheets-Sheet 7

INVENTORS
Howard W. Christenson,
BY James J. Mooney, Jr. &
Robert H. Schaefer
a. W. Neiter
ATTORNEY

United States Patent Office 3,273,344
Patented Sept. 20, 1966

3,273,344
TRANSMISSION
Howard W. Christenson and James J. Mooney, Jr., Indianapolis, and Robert H. Schaefer, Westfield, Ind., assignors to General Motors Corporation, Detroit, Mich., a corporation of Delaware
Filed May 10, 1963, Ser. No. 279,372
43 Claims. (Cl. 60—53)

This invention relates to a transmission and more particularly to a hydrostatic transmission pump, motor and control system.

The hydrostatic transmission employs a pump unit driven by the engine and connected by a high pressure fluid power circuit to a motor unit driving the output. In vehicles having a pair of output traction devices, such as tracks or wheels, a pair of pumps and a pair of motors of the same construction are used. The pumps and motors are of the double acting swash plate type which substantially balance the axial thrust on the swash plate. The double acting pistons extend axially and are arranged in a group about the axis. Each piston has a control valve groove intermediate the ends to control the flow to and the exhaust from the cylinder chamber at each end of the double ended pistons. The pistons are connected to the swash plate which is preferably supported by a spherical bearing engaging the perimeter of the swash plate to provide a bearing support and limit movement in one direction. A universal joint connected between the frame and swash plate prevents rotation of the swash plate and axially locates the swash plate by limiting movement in the other direction. The swash plate arm is slidably connected to a ball joint located in the displacement control piston adjustably positioned in a cylinder mounted transversely of the axis of rotation on the pump input or motor output member to provide an adjustable crank drive assembly. A weight is mounted on the control cylinder which moves reversely with respect to the control piston to balance the drive assembly.

The control system automatically controls the pump and motor displacement in accordance with power demand or pump stroke demand, input speed and power system pressure to operate the system with a low power transmitting fluid flow and at high pressures above a predetermined minimum high pressure to maintain high efficiency. In neutral the reversing valve interconnects the pump delivery and return lines and the motor supply and exhaust lines to unload the pump and permit the motor to freewheel. With the reversing valve in forward, the pumps are connected to drive the motor forward. At zero power or pump stroke demand, the pump capacity is zero and no fluid is pumped or drive transmitted. With a constant speed governor control of the engine more fuel is supplied as the load increases to make full power available at all times. Since the motor, though at maximum displacement for full power operation, is not moving, the system pressure immediately rises to a maximum high pressure value limited by a regulator valve to provide a high starting torque. As the motor moves and drives at a low speed it remains at maximum displacement while the pump displacement is gradually increased and the system pressure quickly falls providing increasing speed with reduced torque multiplication. At a predetermined speed, preferably about .5 speed ratio for full power drive, the pump stroke reaches a maximum and the motor stroke is then gradually reduced with increasing speed ratio to about half stroke at full speed. During this phase of operation, the system pressure would normally continue to decrease, but pressure controls are provided to prevent further reduction in pressure and maintain the pressure at a constant minimum high pressure value for improved efficiency.

At partial power output values obtained by reducing the governor speed control, the pump displacement will increase at the same gradual increase to a similar partial displacement value and thereafter remain at this displacement value. The motor will initially have full stroke, but at the same speed that the pump displacement ceases to increase the motor displacement will start decreasing. The system pressure will decrease faster and be maintained at the same minimum high pressure value. The torque multiplication curve will remain the same.

The operation in reverse is the same except that the connections between the pump and motor are reversed to drive the motor reversely.

The power output to the right and left hand motors may be selectively controlled to provide steering. The steering control increases the displacement of one pump and reduces the displacement of the other pump, to drive one motor faster than the other.

On engine overrun, this hydrostatic transmission provides maximum engine braking within safe engine operating speeds and in addition a hyraulic retarding effect to prevent misuse of the engine due to excess engine speeds. The motor acting as a pump supplies fluid to the pump to drive the pump as a motor to drive the engine. Reduction of pump displacement requires higher pressure to drive the pump and engine which may increase the power system pressure to a maximum value so the motor can retard the load with its maximum rated torque capacity. In this system the engine can provide friction braking equal to its maximum capacity and if additional peak load power due to overrun tends to overspeed the engine, the automatic controls bypass fluid from the high pressure side to the low pressure side of the power system converting pressure into heat which is dissipated in the cooling system to provide braking with a fast response and high capacity.

An object of the invention is to provide in a hydrostatic torque converter of the multiple piston type a plurality of double acting pistons with each end of the piston operating in a chamber, and with each piston having a control groove cooperating with ports in the body to control the flow of fluid from the inlet to the chambers and to control the flow of fluid from the chambers to the outlet in timed relationship with the movement of the pistons.

Another object of the invention is to provide in a swash plate type hydrostatic torque converter a one-piece double acting piston having a portion on each side of the swash plate.

Another object of the invention is to provide in a swash plate type hydrostatic torque converter having double acting pistons, a two-part piston connected by a non-rigid tie-rod permitting accommodation for slight misalignment between the bores in which the piston parts operate.

Another object of the invention is to provide in a swash plate type hydrostatic torque converter a double acting piston consisting of two separate piston elements retained in contact with the swash plate by supercharging the expansible chambers in which each of the pistons operate.

Another object of the invention is to provide in a swash plate assembly an external annular bearing member engaging the perimeter of the swash plate to support the swash plate for wobble movement.

Another object of the invention is to provide in a swash plate assembly mounted in a housing a universal joint connecting the swash plate to the housing to prevent rotation thereof.

Another object of the invention is to provide in a swash plate assembly mounted in a housing, a spherical bearing supporting the outer perimeter of the swash plate and providing a thrust bearing to prevent movement of the swash plate in one direction, and a thrust rod between the swash plate and the housing to provide a thrust bearing limiting movement in the opposite direction.

Another object of the invention is to provide in a swash plate assembly having a rotatable crank having a variable eccentric control consisting of a piston and a cylinder, a ring gear mounted on the external perimeter of said cylinder to provide the driving connection.

Another object of the invention is to provide in a swash plate assembly having a controlled eccentric having a transversely movable control piston and a transversely movable weight counterbalancing the piston and moving in opposite directions in respect to the control piston.

Another object of the invention is to provide in a piston engaging a swash plate through a spherical bearing a lubricant passage connecting the pumping chamber in which the piston operates to the spherical bearing surface and the surface between the spherical bearing and the swash plate.

Another object of the invention is to provide in a swash plate assembly having a controllable eccentric for the swash plate a cylinder and piston for adjusting the eccentricity of the swash plate arm located at an angle to the axis of rotation of the crank assembly and perpendicular to the swash plate arm in the normal mean position to reduce side loading on the piston.

Another object of the invention is to provide in a hydrostatic transmission having a pump and a motor with controls to control the stroke of the pump and the motor, a control arrangement responsive to the pressure in the fluid system for transmitting power between the pump and motor to maintain that pressure above a minimum high pressure value.

Another object of the invention is to provide in a hydrostatic transmission having a pump and a motor and fluid power transmitting circuit connecting the pump and motor, a control valve operative to limit the pressure in either the delivery or return line to a maximum high pressure value.

Another object of the invention is to provide in a hydrostatic transmission having a pump and a motor and interconnecting delivery and return lines, a control to limit the maximum high pressure value operative in response to engine speed to prevent engine overspeed on overrun of the transmission load.

Another object of the invention is to provide in a hydrostatic transmission having a pump with displacement or stroke control and means responsive to the engine speed to reduce the stroke to prevent overloading the engine.

These and other objects of the invention will be more apparent from the following description and drawing illustrating the preferred embodiments of the invention.

FIGURE 1 diagrammatically shows an engine, governor and transmission pump arrangement employed in this transmission.

FIGURES 3 and 4, when arranged as shown in FIGURE 2, are sectional views of the preferred embodiment of a hydrostatic torque converter employed in this transmission.

FIGURE 5 diagrammatically shows the inlet and outlet connections to the chambers of the hydrostatic torque converter and modified piston constructions.

FIGURE 6 diagrammatically shows a modified swash plate mounting arrangement.

FIGURE 7 diagrammatically shows a modified swash plate mounting arrangement.

FIGURE 8 diagrammatically shows a hydrostatic transmission and control system.

FIGURE 9 diagrammatically shows a modified hydrostatic transmission and control system.

FIGURE 10 diagrammatically shows a modified hydrostatic transmission and control system.

Figure 1:
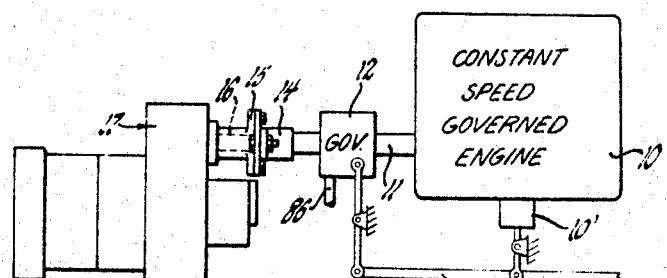
Figure 2:
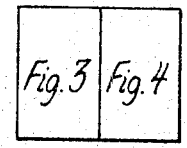

Hydrostatic transmissions illustrative of the invention are shown in the drawing. FIGURE 1 shows a constant speed governed engine 10 having an output shaft 11 driving a speed responsive governor 12, shown in FIG. 8, and a pump 17 of a hydrostatic transmission. The engine has a conventional constant speed governor 10' which controls the fuel feed to the engine to maintain a predetermined constant speed. The governor speed setting may be varied or adjusted by linkage 10" to partial speeds. The output shaft 11 is connected by a coupling part 14 to the coupling part 15 mounted on the input shaft 16 of the transmission pump unit 17 which has an adjustable crank drive assembly 36 driving a swash plate driven pump.

ADJUSTABLE CRANK DRIVE ASSEMBLY

Figure 3:
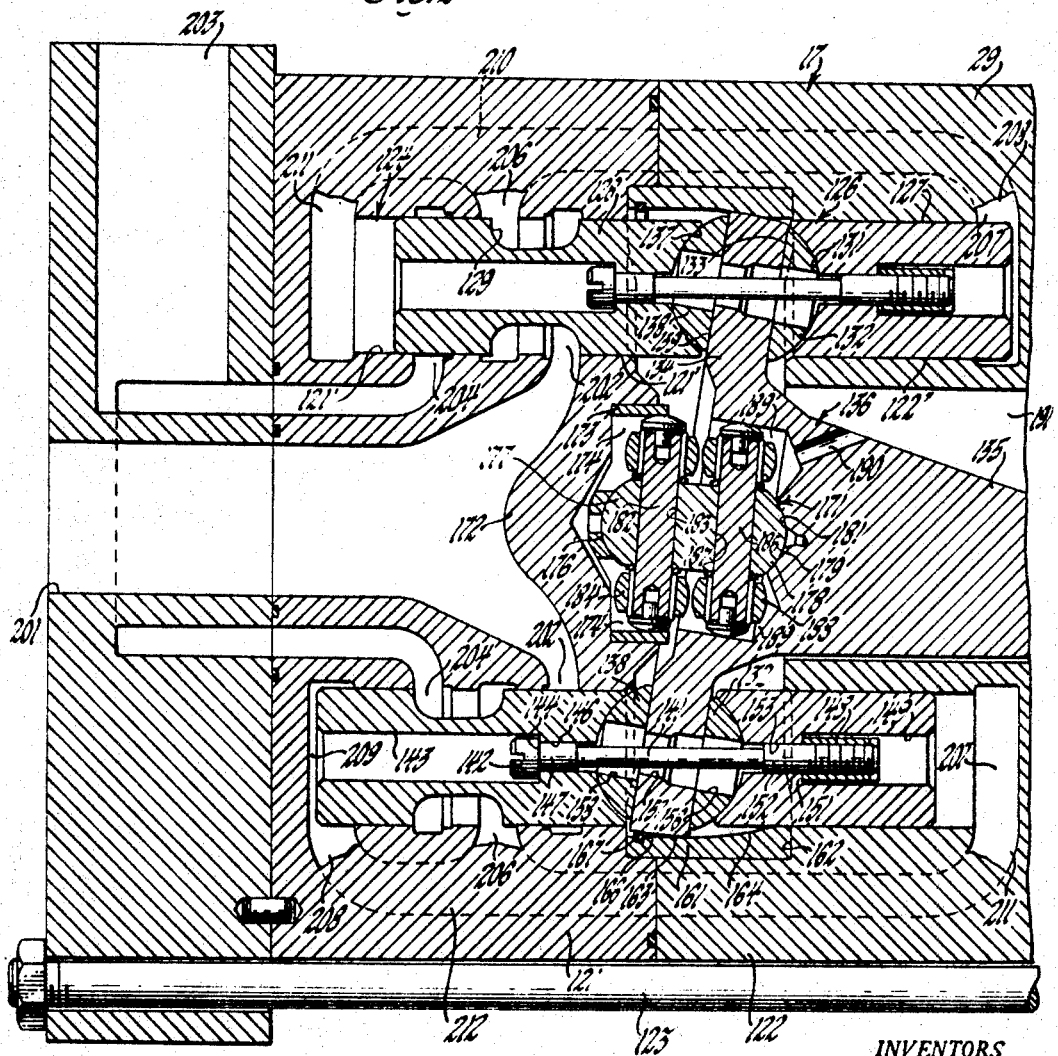
Figure 4:
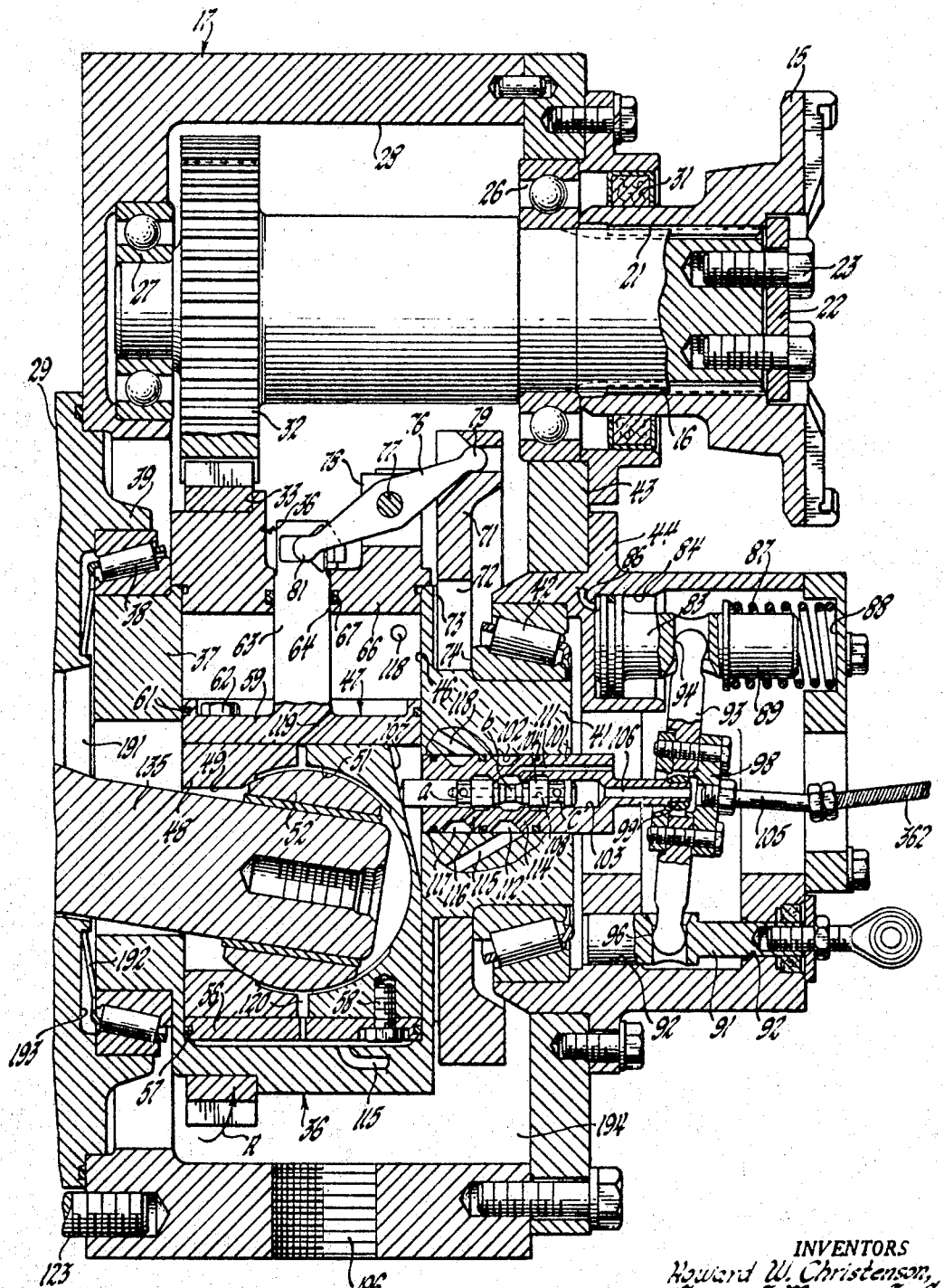

The transmission pump unit shown in FIGURES 3 and 4 has the input coupling part 15 secured to the input shaft 16 by splines 21 and locking plate 22, which is secured in place by screws 23. The shaft 16 is rotatably mounted by bearings 26 and 27 in an offset housing portion 28 of the housing 29 for the pump unit 17. A seal 31 located outboard of bearing 26 prevents leakage from the housing around the shaft 16. Shaft 16 drives a spur gear 32 which drives a ring gear 33 secured by suitable keys or locking bolts, not shown, to the crankshaft assembly 36 which has a journal portion 37 at the pump side supported by a tapered roller thrust bearing 38 mounted on the dividing wall 39 of the housing 29 and a journal 41 at the control side supported by tapered roller thrust bearing 42 in the forward wall 43 of the pump housing. The bearings 38 and 42 are coaxial and support the crankshaft assembly 36 for rotation about a fixed axis when driven by the input shaft 16 and gears 32 and 33.

The crankshaft assembly 36 has a transverse cylinder 46 in which the piston 47 is reciprocally mounted. The piston assembly 47 consists of a central light-weight aluminum body 48 having an opening 49 at one side communicating with the internal spherical bearing surface 51 which is formed of two longitudinal halves with the parting plane parallel to the axis of rotation to permit the insertion of spherical bearing 52 having an outer spherical surface and an inner cylindrical surface for the swash plate control arm 135 and steel heads 56 and 59 having piston rings 57 and 61 suitably secured by screws 58 and 62 to the central portion 48. The control head 59 has a control stem 63 extending through an aperture 64 in the removable cylinder head 66 which is suitably secured by ring gear 33 and bolts and sealed and seals the open end of the cylinder bore 46. A seal 67 is located in a groove in the aperture 64 to prevent leakage around stem 63. The ring gear 33 and other suitable securing means retains the head 66 in the position shown closing the bore 46. The other end of the cylinder bore 46 is closed by the integral structure of the crankshaft assembly 36. An annular weight 71 surrounds the journal 41 and has a central elongated aperture 72 having guide surfaces on opposite sides which cooperate with guide surfaces, one guide surface 73 on the external surface of the crankshaft assembly 36, and another guide surface 74 on the inner race of bearing 42. A lever or walking beam 76 pivotally mounted by a pin 77 on a support portion 78 fixed on the head 66 of assembly 36 is pivotally connected by a pivotal connection 79 to the weight 71 and the pivotal connection 81 to the stem 63 of the piston assembly 47. Thus the piston and the weight reciprocate in opposite directions along axes transverse to the axis of rotation of the crankshaft assembly to maintain the crankshaft assembly in balance.

PUMP DISPLACEMENT CONTROL VALVE

The pump displacement portion of the control system is located in the control housing 44 mounted on wall 43. The engine overload control piston 83 is located in a cylinder 84 in the control housing 44. A fluid pressure signal indicated underspeed is supplied from the engine output speed governor valve 328 by line 384–86 to the end of cylinder 84 to act on piston 83 to urge it against the biasing force of spring 87 located between the other end of the piston 83 and seat 88 in the end wall of control housing 44. The spring is held in position in the cylindrical recessed seat 88 and fits over a cylindrical part 89 of control piston 83 to guide the control piston for axial movement. A pump stroke control rod 91 is reciprocally mounted on a suitable bore 92 in housing 44. A lever 93 is pivotally connected at one end by the ball and socket connection 94 to the control piston 83 and at the other end by the ball and socket connection 96 to the control rod 91. At a central or other intermediate portion the control lever 93 has a socket 98 to receive the ball 99 on valve element 101 to provide a universal connection between the lever 93 and the control valve element 101 of the pump displacement valve.

The valve element 101 is reciprocally mounted in bore 102 of journal 41 and has an inner bore 103 in which the follower valve 104 is reciprocally mounted. The control fluid is supplied via the control pressure line 362 having a flexible portion 105 connected to the socket 98 to lubricate the ball and socket connection. The fluid acts on the unbalanced area of the ball to hold the ball in sealing engagement with the socket. The fluid is supplied by passage 106 extending through the ball to the bore 103 to act against the unbalanced area of valve element 104 to hold the valve in contact with the cam surface 107 on the piston body 48. Fluid is supplied from bore 103 via passage 108 to the grooves $a$ and $c$ follower valve element 104 which, in neutral position shown, are blocked. The groove $b$ is connected to exhaust port and passage 111. Movement of the follower valve element 104 to the right or the control valve element 101 to the left will connect the port 112 via passage 114 to exhaust 111 to drain the lower end of the cylinder via passage 115, and to supply fluid via passage 116 and port 117 to the passage 118 connected to the upper end of the cylinder to move the piston 47 to a more eccentric position to increase the pump stroke and displacement. The opposite movement of either the follower valve 104 or the control valve 101 will connect the lower end of the cylinder 46 via passage 115, port 112, passage 114, and groove $c$ to the source of fluid supply to decrease pump stroke and connect the upper end of the cylinder via passage 118, port 117, passage 116 and groove $b$ to the exhaust passage 111. Thus it will be seen that piston assembly 47 assumes a definite position for each position of the control valve element 101, which is positioned under the joint control of the manual control rod 91 and the governor control piston 83. This provides a joint manual and governor control for the degree of eccentricity of the piston assembly 47 to control the pump stroke and displacement. The fluid supplied to the cylinder by lines 115 and 118 to control the piston position also flows through restricted lubrication passages 119–120 to lubricate ball joint 51–52.

SWASH PLATE PUMP

The cylinder portion of the housing assembly 29 (FIG. 3) is formed of two parts 121 and 122 secured together by tie-rods 123. These parts respectively have a plurality of axial ported cylinder portions 121' and plain cylinder portions 122' aligned to form cylinders 124 located symmetrically in an annular group around the central axis of the pump assembly. Though four equally spaced piston cylinders are illustrated, it will be appreciated that the number may vary in groups of four. The cylinders 124 are closed at each end and have located therein a piston 126, consisting of a plain piston portion 127 at the right and a piston valve portion 128 at the left having control groove 129. The piston portion 127 has at its end adjacent the center a spherical bearing seat 131 cooperating with the spherical surface of bearing 132 formed as a segment of a sphere. The bearing 132 has a flat surface engaging the flat annular surface 133 of plate portion 134 of the swash plate assembly 136. The left piston valve portion 128 also has a spherical bearing seat 137 engaging the spherical surface of the semi-spherical bearing 138. The flat surface of the bearing member 138 engages a flat annular face 139 of the swash plate 134.

The piston portions 127 and 128 are secured together by bolts 141 having a head 142 fitting in a bore 143 in the piston portion 128. The head 142 seats against a shoulder 144 which, in conjunction with the cylindrical shank part 147 closely fitting the reduced diameter bore portion 146, provides a seal and an anchor. At the other end of the bolt 141 a nut 148 is threaded on the bolt and located in a bore 149 in the piston portion 127. The nut 148 is drawn up tight against the shoulder 151 to place the bolt in tension to preload bearings 132 and 138. The bolt also has an unthreaded cylindrical portion 152 fitting a smaller bore portion 153 to provide, in conjunction with the nut 148 engaging shoulder 151, a seal for the bore through piston portion 127. The bolt 141 passes freely through an aperture 156 in the spherical bearing 132, an aperture 157 in the plate 134, and an aperture 158 in the spherical bearing 138 with clearance during all relative movement of these parts. It will be noted that the bolt 141 is only fixed over a short portion of its length at each end relative to the piston portions 127 and 128 and thus has a long relatively flexible shank to permit some minimal lateral displacement of the pistons in case there is any misalignment.

The swash plate assembly 136 is supported for rocking movement in an annular bearing ring 161 secured in a recess 162 in the mating portions 121–122 of the housing assembly. Bearing ring 161 has a cylindrical surface portion 163 meeting a spherical surface portion 164 at its maximum diameter cooperating with the spherical surface portion 166 on the external periphery of the plate 134 of the swash plate assembly 136, in order to support the swash plate assembly for wobble movement and to transmit thrust from the swash plate to the frame to limit rightward movement of the swash plate. A snap ring 167, located at the outboard end of the cylindrical portion 166 of bearing ring 161 provides an anchor for disassembly of the bearing ring.

The axial thrust of the swash plate assembly 136 to the left is transmitted by the universal joint 171 to the portion 172 of the housing 29. The universal joint has a round bearing member 173 secured to the frame part 172 by bolts (not shown) located intermediate the opposed pair of circular bearing bores 174. Centrally located in the bearing member 173 is a spherical bearing 176 cooperating with the adjacent spherical end 177 of the thrust shaft 178. The other end of thrust shaft 178 also has a spherical bearing end 179 cooperating with a spherical bearing surface 181 formed in the end of the arm 135 of the swash plate assembly. A cross pin 182 is located in a bore 183 in the shaft 178 and has at each end a bearing member 184 rotatably fixed to the shaft 182 and axially slidably mounted in the bores 174 to prevent relative rotation and to permit relative tilting movement between the shaft 178 and the bearing part 173 fixed on frame 172. A shaft 186 is located in the bore 187 adjacent the other end of shaft 178 and has bearing members 188 rotatably secured at each end fitting into bores 189 formed in the arm of the swash plate 135 or provided by a separate bearing member like bearing member 173 to prevent relative rotation between the shaft 181 and the swash plate assembly 136 but to permit relative tilting movement. The universal joint 171 transmits thrust from the swash plate assembly 136 to the frame 17 to limit movement of the swash plate assembly to the left and prevents relative rotation between these parts.

Leakage from the hydraulic power circuits fills the cavity 191 in the housing surrounding the swash plate assembly 131 which will be conducted by passage 190 to lubricate the joint assembly 171. The passage 190 is large enough to permit free communication between opposite isdes of the swash plate so that all portions of the chamber 191 are at the same pressure, which is controlled (FIG. 4) by a Belleville spring valve 192 located in an annular recess 193 at bearing 38. When the pressure in chamber 191 exceeds a low predetermined value it moves the Belleville spring 192 to permit flow through the bearing 38 to the dry sump 194 which is connected to the main sump or pump intake via passage 196.

PUMPING OPERATION

The pump power flow system, shown in FIGURE 3, has a return or inlet line 201 connected to an inlet port 202 for each cylinder 124. The delivery or outlet line 203 is connected to an outlet port 204 for each cylinder. Each cylinder also has a control port 206 located between the inlet port 202 and the outlet port 204 controlled by control or valve groove 129 in the piston. A passage arrangement for a four cylinder pump with the crank assembly 36 rotating clockwise (arrow A, FIG. 4) as viewed from the control end, is shown structurally in FIGURE 3 and diagrammatically in FIGURE 5. Referring to FIGURE 3, the closed end of cylinder 122' at the top has a port 207 at the right connected by a helical passage 208 to the control port 206 of the 90° leading cylinder (not shown as located to the rear of the section shown) and to the port 209 of the second or 180° leading cylinder shown at the bottom. The closed end of the cylinder 121' at the top has a port 209 at the left connected by a passage 211 to the control port 206 of the next preceding or 90° lagging cylinder at the center on the lagging side (not shown as in front of section shown), and to the right end port 207 of the second preceding or 180° lagging cylinder at the bottom. Passage 210 shown at the top cylinder control port 206 similarly extends helically to the port 209 of the 90° leading cylinder at the back (not shown) and the port 207 of the 90° lagging cylinder at the front (not shown). Passage 212 shown connected to control port 206 of the lower cylinder extends to port 209 of the 90° leading cylinder at the front and port 207 of the 90° following cylinder at the rear. It will thus be seen that a plurality of similarly arranged helical passages, one for each cylinder each connecting the control port of one cylinder to the port 209 of a 90° leading cylinder and the port 207 of a 90° lagging cylinder. When the adjustable crank assembly 36 is rotated clockwise (arrow A) as viewed from the control or input end with the piston holding the swash plate arm 135 in an eccentric position, the swash plate sequentially reciprocates the pistons 126 to actuate the control valving to connect the inlet to each cylinder end or expanding chamber and the outlet to each contracting chamber and to reciprocate the pistons to sequentially expand and contract each chamber at each end of the pistons. The pumping action is further explained below and diagrammatically shown in FIGURE 5 which also shows structural modifications.

PUMP MODIFICATION

FIGURE 5 diagrammatically shows the fluid connections between the pump cylinders for the pump or motor shown in FIGURES 3 and 4 and with FIGURES 6 and 7 shows modified piston and swash plate assembly constructions. They may be driven by the eccentric drive assembly illustrated in FIGURES 4 or 7. Referring to FIGURES 5 and 6, the first modification has a drive bearing 52 driven by the adjustable eccentric or crankshaft assembly 36 of FIGURE 4 mounted on the arm 216 of the swash plate assembly 217. At the center line of the plate portion 218 of the swash plate assembly, the swash plate is supported by a universal bearing 219 on a portion of the pump frame 221.

The swash plate drives the pistons 223, 223a, 223b, 223c located in cylinders 228, 228a, 228b, 228c. The structure of all the pistons and cylinders is the same and is described with reference to piston 223 and cylinder 228. As shown in detail in FIGURE 5, the spherical bearing assembly 222 which connects each piston to the swash plate, is formed by forming in the piston 223 a recess 224 having opposed spherical seats 226 each receiving a semi-spherical bearing slipper 227 having a spherical surface engaging the spherical seat in the piston, and a flat surface engaging the flat annular face of the swash plate 218.

The piston 223 fits in a bore or cylinder 228 and has a control groove 229 to control the inlet and outlet lines. Each cylinder 228 has a control port 231 centrally located with respect to the length traversed by the recess 229 during piston movement and always connected to recess 229. The inlet line 232 is connected to the inlet port 233 while the outlet line 234 is connected to the outlet port 236 of each cylinder. The right end of each cylinder has a port 237 connected to line 241 and the let port 236 of each cylinder. The right end of each Reading down in FIGURE 5, the top, front, bottom and rear pistons are diagrammatically shown. After the top piston assembly, the others are indicated respectively by the letters a, b and c appended to the reference numerals. The pistons 223, 223a, 223b and 223c are at the top, front, bottom and back, respectively. Each control port 231 is connected by a line 241 to the right end port 237 of a 90° lagging cylinder, such as control port 231 is connected by line 241 to right port 237a. Each control port 231 is also connected by a line 242 to the left port 238 of a 90° leading cylinder, such as control port 231 is connected by line 242c to left port 238c. The inlet and outlet lines are commonly connected respectively to the inlet port 233 and outlet port 236 of each cylinder.

PUMPING ACTION

When the swash plate arm end or bearing 52 is rotated in a clockwise eccentric path (arrow B) as viewed from the control end, the piston 223, as shown in FIG. 5, is just starting to move to the left as indicated by the arrow C on a pumping stroke to pump fluid through port 238, line 242 and port 231a, which is just being connected by groove 229a as the piston 223a moves (arrow D) to outlet port 236a to supply fluid to the outlet line 234. Also, as piston 223 starts to move, the inlet line 232 will be connected via port 233c, groove 229c of piston 223c moving as indicated by arrow F and line 241c to port 237 to supply fluid to charge the right end of the cylinder for pumping on the return stroke. Piston 223a is in the middle of the stroke moving in the direction indicated by the arrow D pumping fluid through port 238a, line 242a to port 231b, port 236b and the outlet line 234. Fluid is being supplied to the right end of cylinder 228a from the inlet line 232 via ports 233, 231 at piston 223 and line 241 to port 237a. The other pistons are supplied in a similar manner, and it will thus be seen that a continuous thrust balanced double-acting pump with the pump piston control groove controlling inlet and outlet flow is provided by the arrangements illustrated in FIGURES 1–7. Reversing direction of rotation will reverse oil flow. Any multiple of 4 pistons may be used.

OTHER PUMP MODIFICATIONS

FIGURE 5 also shows a modified piston 223c which may be used with the swash plate 136 and drive assembly 36 of FIGURES 3 and 4 or the swash plate assembly 243 and drive assembly 244 of FIGURE 7. The piston 223c has two parts *a* and *b* having respectively restricted lubrication passages 145 and 145' connected to spherical bearing sockets 146 and 146'. The slipper bearings 147 and 147' have a spherical part fitting sockets 146 and 146', and a flat surface engaging the swash plate 243. The pump inlet is supercharged with a substantial pressure, i.e., 100 p.s.i., to hold the piston parts and slipper against the swash plate. The high pressure lubricating oil being pumped by the pump is conducted from the pump cylinder by passages 145 and 145' which are restricted to control the amount of lubricant supplied to the spherical bearing surfaces and supplied by passages 148 and 148', which have a laterally enlarged initial portion so they are always connected to passages 145 and 145' to the flat surfaces. Both the flat and spherical surfaces have recessed areas to hydraulically reduce the loading and may have connecting lateral or radial lubricating passages. The plate of swash plate assembly 243 extends radially beyond the pistons 223c and is supported on its external perimeter by a cylindrical bearing 249 mounted on the housing. The crank assembly 250 is similar to the crank assembly of FIGURE 4, but the arm of the swash plate assembly 243 is connected by a universal ball joint 240' transmitting thrust in both directions to the piston 240. The cylinder 239 and piston 240 are mounted at an angle to the axis of rotation of the swash plate and substantially perpendicular to the axis of the arm of the swash plate assembly 243 when in the mean control position from a standpoint of total linear movement for control or when in the normal position during operation to minimize the lateral thrust transmitted from the piston to the cylinder so that most thrust is transmitted through the control fluid.

MOTOR

The above described pumps may be used as motors without change if manual motor displacement control is desired. Suitable automatic motor displacement controls are described below in connection with the transmission systems shown in FIGURES 8, 9 and 10. When high pressure fluid is supplied to the fluid inlet line in the above pumps, they will rotate the crank assembly in the direction it is driven as a pump to drive the output which is connected through gearing to the vehicle drive mechanism. The motors preferably have a stop member to limit movement of the displacement control piston below a predetermined low displacement. FIGURE 7 shows a stop 255 on the piston 240 preventing reduction of displacement below one-half displacement. The stop can be on the cylinder.

TRANSMISSION SYSTEM—FIGURE 8

*Reversing valve connecting pumps and motors*

Figure 9:
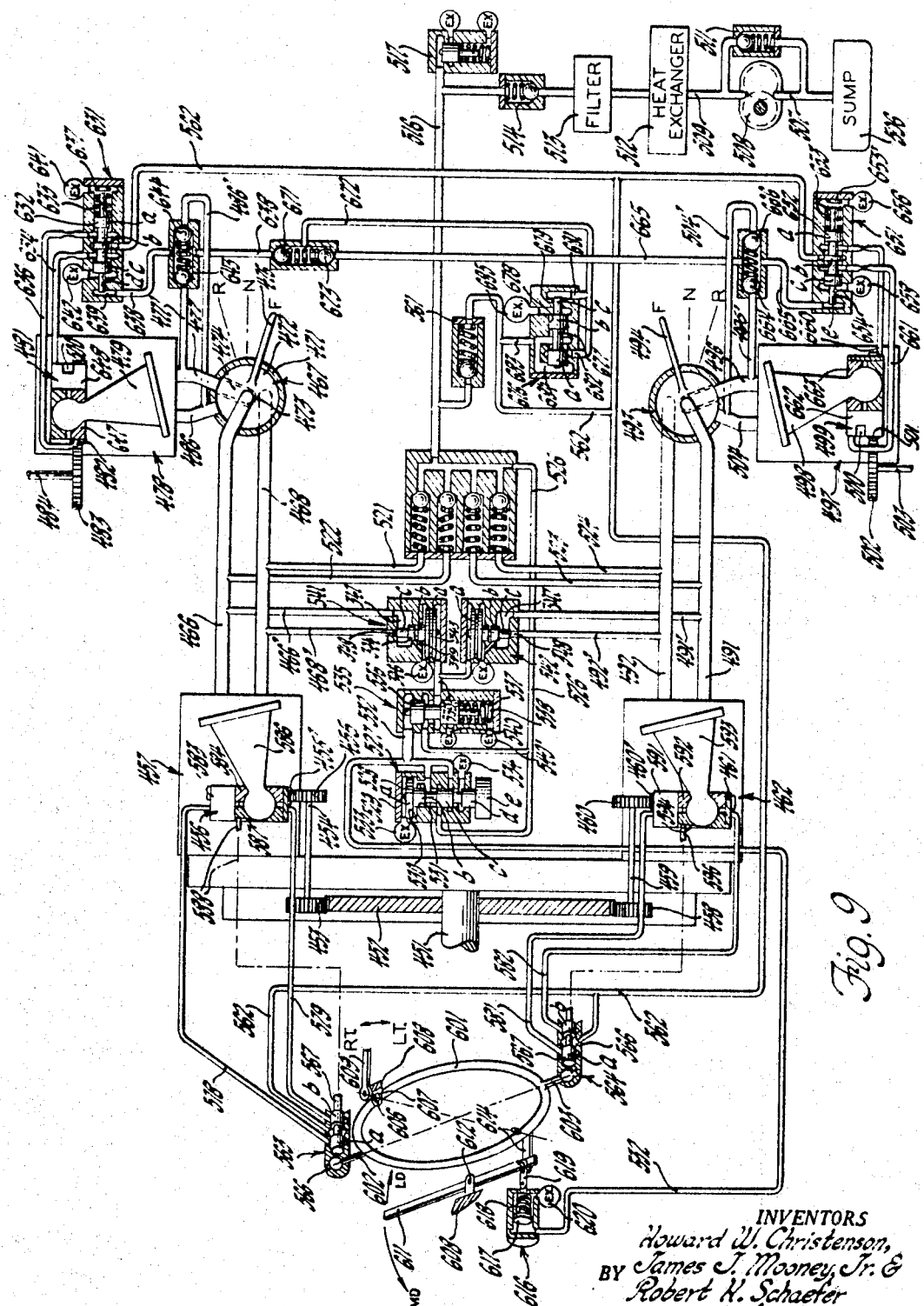

The hydrostatic torque converters described above may be employed as either a pump or a motor in hydrostatic transmissions. The modification shown in FIGURES 3 and 4 is used in the transmission and control system shown in FIGURE 8. The system employs two pumps and two motors so that they may all be of identical structure except for the control valves. The input shaft 16 is used as a common input shaft driven by the engine and drives a spur gear 32, as shown in FIGURES 3 and 4, to drive a gear 33 of the right pump 257 and drive a gear 33 of the left pump 262. The pumps 257 and 262 are the same as the pump shown in FIGURES 3 and 4 and have the crank drive assembly with a displacement control cylinder, piston and valves and a pump having swash plate driven pistons in cylinders. The right pump 257 supplies fluid at high pressure through its power fluid delivery or outlet line 203, FIGURE 3, to the right reversing valve 267 which in the forward position connects line 203 to motor supply line 277 to drive right motor 278 forwardly and the exhaust from the motor flows from the motor via exhaust line 286 to reversing valve 267 which connects the motor exhaust to the pump inlet line 201 to complete the forward drive power circuit. For reverse drive, the reversing valve 267 is moved from the forward position to the reverse position connecting pump outlet line 203 to motor exhaust line 286 to supply power fluid to motor 278 to drive the motor in a reverse direction. The motor exhaust flows via supply line 277 to reversing valve 267 to pump inlet line 201. A suitable reversing valve is shown in FIGURE 9 and described below in more detail. The motors have an output drive like the gear 33 connected by a spur gear 32 to a shaft 16 to drive wheels, tracks or other traction, propulsion or drive devices. In neutral position the reversing valve interconnects all lines, pump inlet and outlet lines 201 and 203 and motor supply and exhaust lines 277 and 286 to unload the pump and permit freewheeling of the motor.

The left pump 262 has a similar fluid power circuit having the left motor inlet and outlet lines 201' and 203' connected to left reversing valve 293 and left motor supply line 296 and exhaust line 304 connecting the left reversing valve 293 to the left motor 297. The left reversing valve 293 is moved to forward position to control left motor 297 to provide forward drive to neutral to provide pump unloading and motor freewheeling and to reverse to provide reverse drive in the same way as explained above for the right pump and motor units.

CONTROL AND COOLING FLUID SUPPLY

The exhaust from the control system and leakage from the pumps and motors or hydrostatic torque converters is returned via passage 196, FIGURE 4, to sump 306. Pump 308 delivers fluid from sump 306 to main line 309 at a volume or flow rate proportional to pump and engine speed and at a pressure limited to a high control pressure value, i.e., 550 p.s.i., to prevent unsafe pressure, which occurs only due to system blockage or other malfunction, by safety bypass valve 311. The main line flows through oil filter 312 and venturi orifice 313 having a high pressure governor line connected to the main line in the high pressure zone before the venturi orifice and a low pressure governor line connected to the venturi throat to provide a pressure differential in these governor lines proportional to flow or the speed of pump 308 and the engine which drives the control fluid pump 308 and the power pumps 257 and 262.

The main line 309 is connected to a control pressure regulator valve 316 having a valve element 317 having a large land *a* and a small land *b* located in a stepped bore 318. The main line is connected to the large end of the bore to act on land *a* and the pressure control line 319 connects the highest of the motor supply or exhaust pressure or the maximum power circuit pressure to act on the small land *b* to oppose main line pressure to regulate main line at a pressure less than but proportional to power circuit pressure, which may vary between 1000 and 5000 p.s.i. and with a 1/10 proportion valve 316 to provide a main line pressure between 150 and 500 p.s.i. Thus the main line provides a control pressure proportional to power circuit pressure and control requirements. The excess fluid is exhausted via cooling and makeup line 321 which flows through cooler 322 to the cooling supply valves 351 and 352. The space between lands *a* and *b* of valve element 317 is exhausted by exhaust 323 so the valve will move freely.

CUT OFF VALVES

The right and left cutoff or regulator valves 341 and 342 regulate the pressure differential between the motor supply and exhaust lines of the right and left pumps 257 and 262. During normal drive operation in either forward or reverse, the pressure in the supply lines 277 and 296 is limited to a high value and any excess pressure is relieved by connecting the supply line to the respective exhaust line 286 or 304. When the vehicle overruns the engine and engine is being employed to brake the vehicle, excessive pressure in the exhaust lines 286 or 304 is relieved by venting these lines through a regulated restriction to the respective supply lines 277 and 296 to prevent overspeeding the engine. This flow of fluid through the restriction provides added braking effort.

The right cutoff valve 341 has a valve element 343 having a large land *a*, an intermediate size land *b* and a small land *c*, located in a three-stepped bore 344. The active areas of lands *b* and *c* are equal. The overspeed signal line 337, which provides a pressure below overspeed from governor valve 328 as described below, is connected to the closed end of the largest diameter portion of the bore 344 to act on the land *a*. The opposite face of land *a*, adjacent land *b* is free of pressure since this portion of the large bore is vented to exhaust 346. The motor supply line 277 has a branch 277' connected to a port 347 to act on the land *b*. The motor exhaust line 286 has a branch 286' connected to the port 348 normally closed by the land *c*.

CUTOFF VALVE OPERATION

During normal forward driving operation when there is excessive pressure, i.e., above 5000 p.s.i., in the supply line 277, this pressure is conducted by branch 277' to port 347 to act on the unbalanced area of land *b*, and when it overcomes the signal pressure in line 337 acting on land *a*, it moves the valve to open port 348 permitting the high pressure fluid in supply line 277 to flow through the branch 277', ports 347 and 348 to the branch 286' and motor exhaust line 286 to reduce the pressure in the supply line. Similarly, on overrun, when the motor exhaust line 286 is at a higher pressure, fluid in branch 286' acts on the unbalanced area of land *c* to overcome the signal pressure on land *a* and open the valve connecting the exhaust line through ports 348 and 347 and branch 277' to the supply line 277. Whenever on overrun, engine overspeed, i.e., above 2200 r.p.m. occurs, the pressure in signal line 337 is vented by the overspeed control valve 328 permitting the cutoff valve 341 to open to immediately reduce the pressure differential between the motor supply line 277 and exhaust line 286 to provide only sufficient energy differential or pressure drop across the pump to motor the pump and engine at governed speed and by the regulated restriction or throttling of the valve add a hydraulic braking effect.

During reverse drive, the cutoff valve operates as described above for forward drive, but with the high pressure in branch 286' and during reverse overrun the valve operates as described above for forward overrun, but with the higher pressure in branch 277' to provide the same functions. When the cutoff valve opens during normal forward and reverse drive to limit the pump output pressure, and during overrun to limit engine speed and provide hydraulic braking, there is a great deal of heat generated by the fluid flowing through the restriction of this valve and thus when the valve opens, land *b* uncovers bypass port 345 which permits a portion of the fluid to exhaust to the sump to be filtered and cooled by passing through the filter and heat exchanger before it is returned to the system through the makeup line 321.

The left cutoff valve 342 is constructed and functions in the same manner and the same reference numerals have been applied to the parts as the right cutoff valve 341 described above. Excessive pressure in left motor supply line 296 and branch 296' acting in port 347 acts on the unbalanced area on land *b* to open the valve at port 348 to permit flow from branch 296' to the branch 304 of motor exhaust line 304. Similarly, on forward overrun, due to excessive pressure or normal pressure on engine overspeed, the high pressure in exhaust line 304' is conducted via branch 304' to act at port 348 on the unbalanced area on land *c* to open the valve to connect branch 304' via ports 348 and 347 to branch 296' of the supply line 296. The reverse operation is similar.

COOLING FLUID SUPPLY VALVES

The right and left cooling supply valves 351 and 352, respectively, control the supply of fluid to and the exhaust of fluid from the right and left power transmitting circuits in order to provide a controlled predetermined volume of fluid continuously passing through the heat exchanger. These valves are constructed and function in the same manner and thus the following description and reference numerals apply to both valves. Cooling valves 351 and 352 have a valve element 353 having lands *a*, *b* and *c* of equal diameter located in a bore 354 having closed ends and ports as indicated below in the description of the connections.

The high pressure fluid, delivered by the right pump 257 during normal forward driving operations through supply line 277 to the right motor 278, is connected by branch 277' to port 356 at the left end of bore 354 to act on the unbalanced area of land *a* of valve element 523 to move it to the normal forward drive position shown uncovering port 357 and connecting this pressure to the right pressure control line 359 to provide a control pressure which is the same as the pressure supplied to the right motor by the right pump. Supply branch 277' is blocked at port 358 by land *a*. The low pressure in motor exhaust line 286 is connected by branch 286' to port 360 at the other end of the bore to act on the unbalanced area of land *c* but cannot move the valve 353 against the high supply pressure acting on the other end of the valve. The makeup or feed line 321 is connected to port 361, between lands *b* and *c* to port 362, branch 286' to feed cooled oil to the motor exhaust line 286 and pump inlet. Fluid is diverted from the motor exhaust line 286 at a point between motor 278 and branch 286' by diversion branch 286*d* to port 363, between lands *a* and *b* of valve 353 to port 364 to the low pressure line, i.e., 150 p.s.i. and the excess returned via exhaust 378 to the sump by the low pressure relief valve 371.

In forward overrun, since the fluid pressure is higher in exhaust line 286 and the pressure is lower in supply line 277, the pressures on the ends of valve element 353 are reversed moving the valve element to the opposite end of bore 354. The high pressure in exhaust line 286 is connected by branch 286' and port 360 to act on land *c* to move the valve and connected by port 365 to right pressure control line 359. The low pressure in branch 277' at port 356 does not move the valve element 353 and is not connected to the line 359. The feed line 321 is connected by port 361 between lands *b* and *c* and port 367 to branch 277*d* to supply cool fluid to the power system as the fluid flows to motor 278 now acting as a pump. Branch 277' is connected by port 358, between lands *a* and *b* to port 364 and low pressure line 366 to exhaust hot fluid from the power system. In forward drive or overrun, the hot oil is diverted and further downstream cool oil is introduced.

During reverse drive, the cooling valve operates as in forward overrun and during reverse overrun the cooling valve operates as in forward. Though cool oil is introduced upstream from the diversion of hot oil the cooling requirements are less.

The left cooling valve 352 is constructed and operates in the same manner and has the same reference numerals. In forward drive the high pressure in left motor supply line 296 and branch 296' enters port 356 and moves the left valve 352 to the position shown connecting this pressure via port 357 to the left pressure control line 369. In this position the left valve element 352 connects feed line 321 to branch 304' connected to line 304 near left pump 262 to supply cool fluid to the power circuit. The hot fluid is exhausted or diverted by branch 304*d* nearer the motor 297 and connected to low pressure line 366.

On overrun the high pressure in exhaust line 304 is connected by branch 304' to act on land *c* to move the valve and connected to left pressure control line 369. Hot oil is diverted from motor supply line 296 through the low pressure line by branch 396' to low pressure line 366 and cool oil is fed from line 321 to line 296*d* to line 296 downstream and nearer the motor.

LOW PRESSURE RELIEF VALVE

The relief valve 371 has a valve element 372 having lands *a* and *b* of equal diameter located in a bore 374. Low pressure line 366 is connected through the bore between lands *a* and *b* at all times and communicates via passage 376 to the closed end of bore 374 to act on land *a* to urge the valve against the biasing spring 377 to connect line 366 via exhaust 378 to sump to regulate the pressure in line 366 at a low pressure, i.e., 150 p.s.i. The spring chamber has an exhaust 379 for leakage fluid. Since all exhaust from the main line regulator valve 316 flows via line 321, the cooling valves and the power system to line 366 which is regulated by valve 371 at a low pressure, the minimum main line pressure is the same, i.e., 150 p.s.i.

GOVERNOR VALVE

The governor 12 includes the engine driven pump 308, venturi 313, associated lines and governor valve 328 which has a valve element 381 having lands *a*, *b* and *c* of equal diameter in a bore 382 having closed ends. High pressure governor line 315 is connected to the upper closed end to act on land *a* to urge the valve down from underspeed to normal and overspeed positions. The springs 383 and 383' and the low pressure from low governor pressure line 314 to the chamber at the lower closed end of the bore acting on land *c* act upwardly. The low governor pressure and the inner spring 383' act directly on the valve element 381 to bias the valve from overspeed through normal to underspeed position. The outer spring 383 acts through a washer 383" whose movement is limited by a stop shoulder in the valve bore so the outer spring only biases the valve from overspeed to normal position. Both springs seat on movable abutment 385. With the valve in the normal speed position shown at normal engine or pump input speeds, i.e., between 1700 and 2200 r.p.m. for an engine governed at 2100 r.p.m., low pressure line 366 is connected between lands *b* and *c* to overspeed signal line 337 while overload signal line 384–86 is connected to exhaust 386. When the governor pressures indicate engine overspeed, the valve moves down from normal to overspeed position against both springs blocking low pressure line 366 and connecting overspeed signal line 337 to exhaust 387 to bypass oil at overload valves as explained above to limit engine speed. When the engine speed is lugged down below normal operating speed, inner spring 383' moves the valve element up from normal to underspeed position and low pressure line 366 is connected to overload signal line 384 to move biasing piston 83. The abutment 385 is moved by the engine governor speed control linkage 10" to vary the speed response of governor 12 with the governed speed of governor 10'.

PUMP DISPLACEMENT CONTROLS

The right and left pump displacement controls 391 and 392 are the same as described above with reference to FIGURE 4. Each displacement control has a pump stroke or displacement control rod 91 which is manually actuated. The engine overload control 83 is actuated on underspeed by pressure supplied by the pump overload signal line 384 and branches 86 to reduce pump stroke. These controls through lever 93 jointly position the sleeve valve element 102 of the displacement control valve assembly while control piston 47 through cam 107 controls valve element 104 to control the displacement in accordance with the position of the center of lever 93. Stroke control rod 91 as moved from zero stroke position to full stroke position will demand a pump stroke in accordance with its position and will provide such stroke unless the overload piston reduces the stroke to prevent engine overload.

MOTOR DISPLACEMENT CONTROL

The right and left displacement control or constant pressure valves 396 and 397 control the displacement of the motor to prevent reduction of the pressure in the high pressure line in the power transmitting circuit below a minimum high pressure value varying with pump displacement. Since these valves are of identical construction, the following description and reference numerals apply to both valves. The displacement control valves have a valve element 398 having lands *a*, *b* and *c* of equal diameter located in a bore 399. The main line 309 is connected to the center of the bore and blocked by the land *b* when the valve is in the central position. With the valve in this position, the more displacement port 401 is located between the lands *a* and *b* and blocked while the less displacement port 402 is located between the lands *b* and *c* and blocked. With the valve in the neutral position shown, exhaust 403 is blocked by the land *a* while exhaust 404 is blocked by the land *c*. The exhaust 406 exhausts leakage fluid from the space between the valve element 398 and the plug or piston 407. The pressure control line, right 359 or left 369, is connected to the pressure control port 408 to act on the plug 407 to bias the valve in a more displacement direction. A spring 409, seated on a movable abutment 411 biases the valve in the opposite or less displacement direction. Exhaust 410 vents the spring chamber. The movable abutment 411 is connected to the displacement control rod 91 by a suitable linkage which may include a rod 412 suitably attached to the displacement rod 91 and extending from the displacement control rod 91 at the left of the drawing to the motor displacement control valve 396. The rod 412 is pivotally connected at one end to a direction reversing lever 414 which is pivoted to the housing at its center and at the other end to a rod 416 fixed to or abutting the abutment 411. The linkage 412–414 and 416 thus positions the abutment between zero and full pump displacement positions in accordance with the position of the displacement control rod 91.

The more and less displacement ports 401 and 402 of the right displacement valve 396 are connected by the right more and less displacement lines 417 and 418 to the more and less displacement chambers respectively of the control cylinder of right motor 278 which is the same as the control cylinder 46 of FIGURE 4 to control the displacement of the pump.

The left displacement control valve 397 has its more and less displacement ports 401 and 402 connected respectively by the left more and less displacement lines 419 and 421 to the cylinder of the similar left motor 297 to control the motor displacement.

Figure 11:
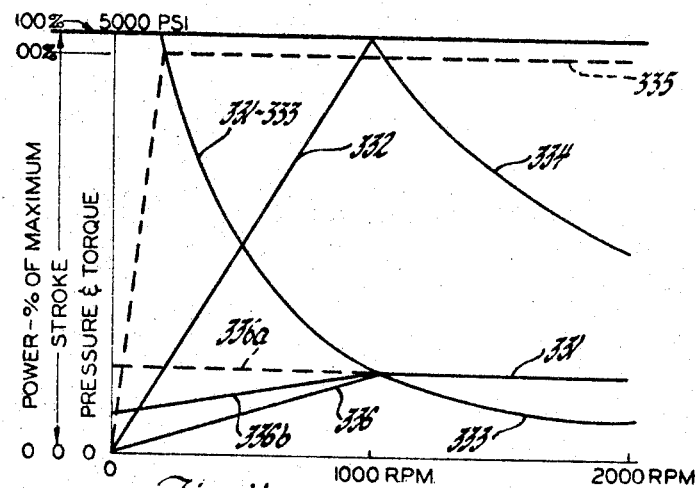
FIGURE 11 shows the operating curves for these hydrostatic transmissions at full power.
Figure 12:
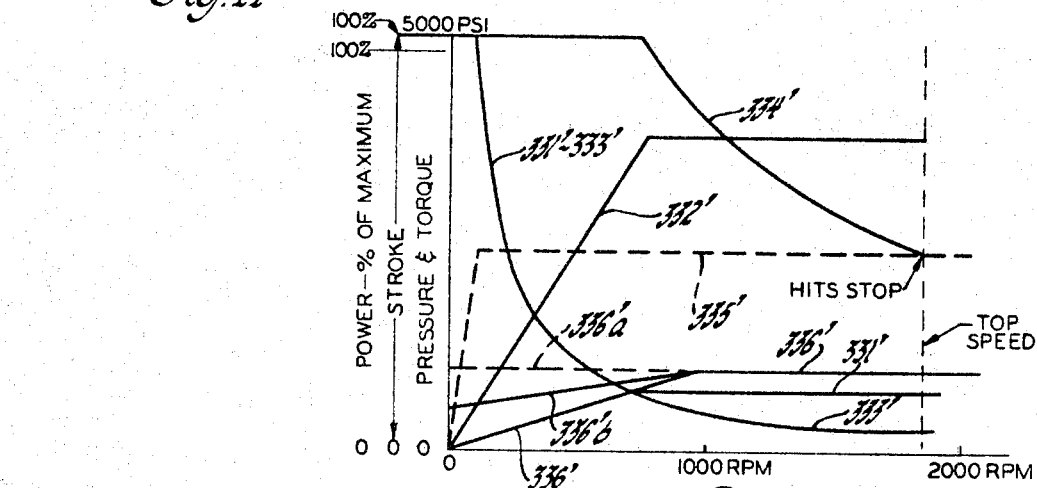
FIGURE 12 shows the operating curves for the hydrostatic transmissions shown in FIGURES 8 and 9 at half power.

The displacement control valve 396 and 397 control the displacement of each motor in order to maintain a minimum pressure of fluid being supplied to the motor at a value varying with pump displacement demand or the position of the control rod 91 for the pump supplying that motor. The high pressures from the power circuits connected by the right and left pressure control lines 359 and 369 act on plugs 407 to move the pump displacement valves to the more displacement position to hold the motors at full displacement whenever the system pressure curve, FIG. 11, is above the minimum pressure curve 336, FIG. 11, varying from low to high, i.e., zero to 1000 p.s.i., with pump displacement demand. The minimum pressure curve 336 is obtained when pump displacement demand is gradually raised with displacement. If the pump displacement control is set at full displacement relying on the overload control to provide a gradual displacement increase, the minimum pressure is always the high value, i.e., 1000 p.s.i., curve 336*a*. When the system pressure drops to the minimum pressure indicated by the curves, the motor displacement is reduced to maintain a constant minimum system pressure. The spring 409 at zero pump displacement demand has zero biasing force so curve 336 starts at zero pressure and increases to a maximum, i.e., 1000 p.s.i. at full stroke demand or 1000 r.p.m. This arrangement has the advantage of holding full motor displacent during a larger portion of the operation. The springs 409 may be set to provide a minimum pressure, i.e., 500 p.s.i., varying with pump displacement demand as indicated by curve 336b to maintain the minimum pressure at a higher value. A partial power operation, one-half power is illustrated in FIG. 12. Since only one-half power, curve 335′, is provided, the torque curve 333′ and pressure curve 331′ drop faster. The pressure drop will be limited at the point that curve 331′ crosses curve 336′ and at this speed pump displacement, curve 332′, will reach a maximum at about three-fourths the displacement, and motor displacement will be reduced from full displacement gradually to one-half displacement where the control piston hits a stop 500, FIG. 9, at top speed, curve 334′.

OPERATION—FIGURE 8

The power flow circuits each consisting of a delivery, return, supply and exhaust lines controlled by a reversing valve provide fluid transmission of power between the pumps and motors.

When the right reversing valve 267 is in the neutral position N, the right pump delivery 203 and return 201 lines and the motor supply 277 and exhaust lines 286 are all interconnected at the reversing valve so that the transmission is in positive neutral with the pumps unloaded and the motors freewheeling. The left reversing valve 293 similarly interconnects the left delivery 203′ and return 201′ lines and supply 296 and exhaust 304 lines for positive neutral. When both the reversing valves 267 and 293 are moved to the forward position F, both motors are driven in a forward direction. The right pump delivery line 203 is connected to deliver pump pressure to the right motor supply line 277 to drive the right motor forwardly and the right motor exhaust 286 is connected to the right pump return line 201. Similarly, the left delivery line 203′ is connected to the left motor supply line 296 and the motor exhaust 304 is connected to the pump return 201′.

The transmission having positive displacement pump and motors and a displacement control shown in FIGURE 8, is preferably employed with an engine operating at a governed speed. The transmission will automatically select the proper torque multiplication ratio from a large range of torque multiplication ratios available to provide an infinitely variable drive for starting and driving a load or vehicle with maximum performance obtained by maintaining the engine operating at its governed speed for full power. As indicated by the pump displacement curve 332 and the motor displacement curve 334 of FIGURE 11, which illustrates the full power operating curves for the transmission shown in FIGURE 8, the pump displacement is zero at zero speed and the motor displacement is full, so no power is transmitted. The first increment of pump displacement theoretically provides infinite torque multiplication but about 10:1 in most practical applications is obtained. At the mean engine speed, i.e., 1000 r.p.m., both the pump displacement and the motor displacement are full and a 1:1 drive is provided. In the higher speed range, the displacement of the motor is reduced, as indicated by the curve 334, while the pump continues to operate at full displacement to provide decreasing torque multiplication through increasing overdrive ratios.

The transmission is in neutral when the displacement control rods 91 for pumps 257 and 262 are in the zero displacement position locating the eccentric crank control 36 (FIG. 4) and the swash plate arm on the axis of rotation so that the pump pistons are not moved and no fluid is pumped to the power circuits connected to the motors 278 and 297. Whenever the engine is running, the engine driven pump 308 supplies fluid to the line 309, which is regulated at a low control pressure value, i.e., 150 p.s.i., by the regulator valve 316 to supply control fluid to the control system and overage fluid to makeup line 321 and the cooling valves 351–352 to the power circuits of the transmission to condition the transmission for operation.

The operating characteristics of the transmission transmitting full engine power to drive a full load are shown in FIGURE 11. The right and left displacement control rods 91 may be manually moved gradually from the zero displacement position to the full displacement position so the valve members 104 in both the right and the left control units act without the overcontrol of the engine overload control pistons 83 to provide the gradually increased pump displacement of curve 332 for both the right and left pumps. When the pump displacement controls 91 are moved more quickly or instantaneously to the full displacement position, the overload control pistons 83 only permit pump displacement to increase gradually, i.e., curve 332 showing the maximum rate of increased displacement permitted. On moving pump displacement control rods to full displacement, the valve members 101 will control the pumps 257 and 262 to supply fluid under pressure to the power circuit. With the reversing valves 252 and 293 in the forward position, this fluid is connected by lines 277 and 296 respectively to the motors 278 and 297. Since the motors are not rotating, flow is blocked, and the power circuit pressure quickly rises, as indicated by curve 331 in FIGURE 11, and is limited by the above explained operation of the cutoff valves 341 and 342 at a maximum power circuit pressure, i.e., 5000 p.s.i. The motors are in the full displacement position, and this maximum pressure provides maximum torque to drive the load and a maximum load on the engine which will reduce the engine speed slightly below the governed speed causing the overload and overspeed governing valve 328 to supply fluid to the overload signal line 384 which actuates the overload pistons 83 to move them in a direction opposite to the movement of rod 91 to position the displacement control valve 104–105 and pumps 257–262 at substantially zero or a very low displacement position, less than the initial displacement. This permits the engine to return to governed speed and the overload control pressure line 86 is momentarily cut off by the governor valve 328 to permit the spring 87 to return piston 83 to provide a small increment of increased displacement until the speed is again reduced. This operation continues providing a gradual increase in the pump displacement as shown by the pump displacement curve 332, FIG. 11. For this type of operation piston 83 must move enough to reduce the displacement to zero on full movement of rod 91. Reduced movement of piston 83 will permit a proportional degree of overloading.

Maximum power during full power operation is obtained at a very low speed, as indicated by the power curve 335. As soon as maximum power is obtained, the power circuit pressure drops as indicated by curve 331. It will be noted that the power circuit pressure curve 331 and the torque curve 333 are the same in the first half of the speed range at full power where the motor is at full displacement, curve 334. The pump displacement, as indicated by curve 332, gradually increases to a maximum at a mean speed, i.e., one-half speed, 1000 r.p.m. The overload control pistons 83 will properly position the pump displacement control valves to provide the proper torque multiplication to maintain the engine at the governed speed. The pump stroke reaches a maximum at 1000 r.p.m. because the governor valve does not provide an overload pressure above this speed. The motor displacement valves 396 and 397 maintain full motor displacement as long as the power circuit pressure is above the minimum pressure at full pump displacement, curve 336, i.e., 1000 p.s.i., which is maintained to half speed at full power.

From half speed to full speed the pump displacement remains at a maximum as indicated by the pump displacement curve 332. The system pressure, during this range from half speed to full speed, would, if uncontrolled, further reduce along the same general curve, similar to the torque curve 333, FIGURE 11. However, in order to maintain high efficiency, the displacement control valves 396 and 397, as explained above, reduce the motor displacement, as shown by the motor displacement curve 334 to maintain a minimum system pressure of 1000 p.s.i. in the fluid power circuit, as shown by system pressure curve 331. The torque curve 333, FIGURE 11, shows that hydrodynamic drive system provided by the pumps and motors provides an overdrive when the motor displacement is reduced. It is preferred that the input gearing between the engine and pumps provide a greater speed multiplication than the speed multiplication between the output and motor so 1:1 overall drive is at a higher speed, i.e. 1500 r.p.m. or full speed, i.e., 2000 r.m.p. The power output curve 335 indicates that full power is available throughout the major portion of the operating range.

When the engine with a speed limiting governor is operating at any partial power output, i.e., half engine power with the throttle at about half throttle position, the transmission will operate in a similar manner to provide the operating characteristics illustrated by the curves in FIGURE 12. The power as indicated by the power curve 335' will quickly rise to half power and thereafter remain constant. The pump displacement as indicated by curve 332' will rise in the same manner as curve 332 to about three-fourths displacement, but will not rise any higher because the engine overload control piston 83 limits the increase in displacement. At this same speed, i.e., 750 r.p.m., the power circuit pressure 331' will tend to fall below the curve 336' indicating the minimum power circuit pressure and thus reduce the motor stroke as indicated by curve 334' to regulate the power circuit pressure at a constant value, i.e., 750 p.s.i., as indicated by curve 331'.

If the pump displacement controls are in the full displacement position, the minimum pressure curve 336'a will be in effect, providing a higher minimum pressure from the point where curve 331' crosses curve 336'a, i.e., 1000 p.s.i., and an earlier reduction in motor displacement at this point. If a higher pressure spring, i.e., 409, is employed in the motor displacement valve i.e., 396, the pressure is limited at the point where curve 331' crosses curve 336'b and motor displacement is reduced at this point.

The reduction of motor displacement is limited by a stop 500 (FIG. 9) at a mean value, i.e., one-half stroke as indicated by the curve at the top driving speed at one-half power.

Thus this control system provides in the first range of operation, i.e., zero to 1000 r.p.m. manual control of the load or ground speed by means of the pump displacement control. The speed, as indicated, increases with increasing pump displacement within the limits of the overload control. Thereafter the transmission operates much like a ratio transmission in high ratio and will accelerate the load or vehicle to higher speeds between 1000 and 2000 r.p.m. if the power is available to provide this acceleration.

For reverse drive both of the reversing valves 267 and 293 are placed in the reverse position to reverse the connections to the motors. As explained in detail above, the high pressure outlet from the pump 257 is then connected to the motor exhaust line 286 and the motor supply line 277 is connected to the pump intake line 201. A similar reversal of the connection between the left pump 262 and the left motor 297 is provided by a left reversing valve 293. With these connections the pump, driven in the same manner as in forward drive, drives the motors in the reverse direction to provide reverse drive. The control system otherwise functions in the same general manner as in forward drive. The input drive for the pump rotates in the same direction and the pump displacement controlled by the displacement control rods 91 and the engine overload control pistons 83 and valves 105 function as in forward drive to control pump displacement. The cutoff valves 341 and 342 function in the same manner as explained above for forward drive and forward overrun, except that with reference to the right motor the motor exhaust line 286 is the high pressure line in reverse drive and the motor supply line 277 is the high pressure line in reverse overrun. As explained above, the cutoff valves 341 and 342 function the same way regardless of which of these lines has the higher pressure. Thus in reverse they function as in forward to limit the power circuit pressure to a safe maximum value, i.e., 5000 p.s.i. both in reverse drive and reverse overrun. The engine overspeed control would function in the same manner to open the cutoff valves at a lower pressure to prevent engine overspeed and provide hydraulic braking. The cooling valves 351 and 352 function in substantially the same manner. However, the relative position of the supply and the exhaust from the supply line 277 operating as a return line from the motor to the pump would be reversed and provide less effective cooling. Since the duration of reverse operation is less than forward operation, this arrangement will provide sufficient cooling. The motor displacement control valves 396 and 397 will function in the same way as in forward drive to reduce the motor displacement to prevent reduction of the power circuit pressure below curve 336' which varies with pump displacement demand.

Steering is provided by actuating pump displacement control rods 91 individually to increase the displacement of one pump while decreasing displacement of the other pump. Thus if the displacement of the right pump is increased and the displacement of the left pump is decreased, left steer will be obtained. This is done by a suitable whiffle tree linkage or the ring 601 of FIG. 9. Pivot steer may also be obtained by placing one of the reversing valves in the forward drive position and the other reversing valve in the reverse drive position. During steering operation the controls function in the same manner as explained above for either the forward or reverse drive as provided by the steering controls.

When the vehicle or other load overruns the engine in forward drive, the motors 278 and 297 will supply high pressure fluid via exhaust line 286 and 304, respectively, to return lines 201 and 201' to drive the pumps as motors so that the vehicle is retarded by engine braking. When the pressure in the exhaust and return lines increases above the high pressure value, i.e., 5000 p.s.i., it is relieved by the cutoff valves 341 and 342. The right return line 286 is connected by branch 286' to port 348 of the right cutoff valve 341. The pressure in port 348 acts on the land c of valve element 343 and opens the valve to connect the pressure via branch 277' to the exhaust line 277 to prevent increase of pressure above this high value. The throttling effect at port 348 effected by land c absorbs energy from the system and converts it into heat, heating the fluid and thus adds to the braking effort of the engine by providing an independent braking effort due to the hydraulic system. Some of this heated fluid is permitted to bypass from the port 347 through bypass 349 to exhaust so that a larger volume of fluid passes through the heat exchanger 312 when the cutoff valve 341 functions to bypass fluid. The left cutoff valve 341 will similarly function to limit the pressure in the exhaust line 304 to a high value, i.e., 5000 p.s.i. If the vehicle or load overruns the engine to a degree causing dangerous overspeed engine operation, the governor valve 328 cuts off the supply of control pressure from line 366 to overspeed signal line 337 to permit the cutoff valves 341 and 342 to dump the fluid in exhaust lines 286 and 304 regardless of pressure. This reduces the drive to the engine and reduces engine speed to a safe value. The high engine braking and high hydraulic braking due to the throttle effect on the fluid passing through the cutoff valves continues.

MODIFIED CONTROL SYSTEM—FIGURE 9

Pumps and motors

The hydrostatic transmission shown in FIGURE 9 uses the power plant and may use any of the hydrostatic torque converters shown in FIGURES 1–8 for the pumps and motors and employs a modified control system. The input shaft 451 driven by a power plant shown in FIG. 1 drives gear 452 which in turn drives gear 453 and shaft 454, gear 455 and ring gear 455' on the crank assembly 456 of pump 457. The gear 451 also drives a gear 458 driving shaft 459, gear 460 and ring gear 460' on the crank assembly 461 of the left pump 462. The individual pump input drive, like shaft 454, gear 455 and ring gear 455', may be like input shaft 16, gear 32 and ring gear 33 of FIGURE 4. The crank assembly, such as the right pump crank assembly 456 may be like the crank assembly 36 of FIGURE 4. The other portion of the swash plate and pump assembly 457 may also be constructed as shown in FIGURES 3 and 4, or FIGURES 5 to 7. Though the pumps 457 and 462 are illustrated for convenience as being on the right and left side of the vehicle with the pumps forward of the driving axle, the reference more importantly indicates that the right pump drives the right motor and the left pump drives the left motor, since in a preferred embodiment of the invention the pumps are located one above the other and between the motors.

POWER FLOW SYSTEM

The right pump 457 supplies fluid under pressure to the right delivery line 466 of the power circuit which is connected by the right reversing valve 467 to right motor 478.

The right reversing valve 467 consists of a cup-shaped base member 471 mounted in a stationary position on a suitable support and having the return line 468 connected to the base. The valve also has a cover member 472 rotatably mounted within the cup member and sealed at the periphery to the lip of the cup member to provide an internal chamber exhausted by return line 468. The delivery line 466 is connected by a rotatable seal 473 at the center of the cover to a radial passage 474 formed on the underside of the cover member 472 and terminating in fluid sealed engagement with the walls of the cup member 471 to connect delivery line 466 when the valve cover 472 and its handle 476 are in the forward position F, shown, to supply fluid to the supply line 477 for the right motor 478.

The motor 478 may be constructed in the same manner as the pump illustrated in FIGURES 3 and 4 and thus the supply of fluid via line 477 to the cylinders actuates the pistons to move the swash plate 479 which, through the control piston 481, ring gear 482, output gear 483 and output shaft 484, drives the traction or propulsion devices. This output gear arrangement may be the same as the pump input gear arrangement, shaft 16 and gears 32, 33 of the pump unit illustrated in FIGURES 3 and 4. The exhaust from motor 478 flows via line 486 directly into the cup 471 of reversing valve 467 and is connected to the return line 468 for flow to the pump 457.

The reversing valve 467, when moved to the reverse position with the handle 476 in the reverse position R, positions the connecting passage 474 for connection to the exhaust line 486 to reverse the flow through the motor 478 and drive the motor in the reverse direction. In the neutral position N the reversing valve interconnects all lines, since the port opening of passage 474 is wider than the space between the connection of lines 477 and 486 to reversing valve cup 471. Thus the pump delivery line 466 and return line 468 are interconnected to unload the pumps and the motor supply line 477 and exhaust line 486 are interconnected to permit free wheeling of the motor.

The left pump 462 has a similar delivery line 491 and return line 492 interconnected by a similar reversing valve 493 having a control handle 494 to supply line 496 which supplies left motor 497 to drive it in the forward direction, by reciprocating the pistons to drive the swash plate 498 and rotate the control assembly 499, which has a ring gear 501 driving the output gear 502 and output shaft 503. The fluid returns from the motor via exhaust line 504, which is connected by the reversing valve in the forward position to the return line 492.

When the reversing valve 493 is moved by handle 494 to the reverse position R, the delivery line 491 is connected to exhaust line 504, to drive the motor 497 in reverse and the supply line 496 is connected to the return line 492.

LOW PRESSURE CONTROL AND MAKE-UP FLUID SUPPLY

The leakage fluid, as explained above from the hydrostatic torque converters employed as pumps and motors exhausting at port 196, FIG. 4, together with other leakage from the control system is returned to the sump 506. The fluid supply system for the control and power systems draws fluid from the sump 506 via the pump intake line 507 which supplies fluid to the pump 508 delivering fluid to the main line 509 which is maintained at a regulated pressure by the pressure regulator valve 511. Main line 509 is connected through a heat exchanger 512 to cool the operating fluid and through a filter 513 to clean the operating fluid. After this pressure drop, the main line 509 is connected through a check valve 514 to the feed line 516, which is regulated at a lower valve by regulator valve 517. The check valve 514 prevents, under some adverse operating conditions, reverse flow in the heat exchanger and filter which may be caused by high pressure power system fluid in the delivery and return lines being connected to the low pressure main line. The pressure regulator valve 511 provides a safety bypass at a moderately high pressure, i.e., 250 p.s.i., in the main line 509 to limit the pump output pressure to this safe value under abnormal conditions, i.e., cold oil, and the pump normally provides a pressure head for flow through the heat exchanger and filter. The regulator valve 517 regulates the pressure of the feed line 516 at a lower pressure, for example, 150 p.s.i., to insure a continuous pressure differential across the heat exchanger and filter in the proper direction.

The feed line 516 is connected through a plurality of check valves and branches to each of the return and delivery lines. The check valve branch 521 feeds the return line 468, the check valve branch 522 feeds the delivery line 466, the check valve branch 523 feeds the delivery line 491, and the check valve branch 524 feeds the return line 492. On normal forward and reverse driving, the delivery lines 466 and 491 will be operating at a pressure as high as, i.e., 5000 p.s.i., and their respective branch feed lines will be closed by the check valves. However, the return lines 468 and 492 will be operating at a very low pressure, and the 150 p.s.i. feed line pressure will open the check valves to supply any needed make-up fluid. When the vehicle overruns the engine, the motors 478 and 497 will act as pumps pressurizing the return lines 468 and 492 to drive the pumps as a motor and then the low pressure feed line may supply make-up fluid to the delivery lines 466 and 491. The low pressure feed line 516 supplies through check valve 561 the displacement control line 562 when the high control pressure in feed line 683 is less than the low control pressure, i.e., 150 p.s.i. The high control pressure zero to 500 p.s.i. is supplied from the power flow system via the reduction regulator valve 676 described below under the heading "High Pressure Control Fluid Supply."

GOVERNOR AND RELAY VALVES

The low pressure feed line 516 has a branch 526 connected to a governor 527 and a relay valve 535. The governor has a valve element 528 located in a valve body 529 rotatably mounted on the input shaft 451. Valve element 528 has a large land $a$ located in a large portion of bore 530, control lands $b$ and $c$ and $d$ located in bore 531 and a weight $e$. The pressure from governor line 532 acts upwardly on the land $a$ in opposition to centrifugal force of the weight $e$. The exhaust 533 vents the end of the valve bore 530 beyond land $a$. With the valve in the central position shown, the feed line 526 and the governor line 532 are both blocked by the valve from exhaust 534. Upon an increase in speed, weight $e$ moves downwardly connecting the feed line 526 between the land $b$ and $c$ to governor line 532 to increase the governor pressure. When the governor pressure, acting on the unbalanced area of land $a$, overcomes the centrifugal force of weight $e$ and moves the valve upwardly, the supply line 526 is cut off and the governor line 532 is connected to exhaust 534, to regulate the governor pressure in accordance with speed.

When the engine is operating at an excessive or dangerous speed, the governor pressure will reach a valve sufficient to move the valve element 536 of relay valve 535 downwardly in the bore 537 against the biasing force of spring 538 to connect the relay line 539 to exhaust 540 so the cutoff valves exhaust the high pressure from the power flow system. When the speed is reduced, the spring will return the valve to connect the feed line 526 between the lands of valve element 536 to the relay line 539 to supply pressure to the cutoff valves 541 and 542 to maintain a high pressure in the power flow system. The exhaust 540' drains the spring chamber end of the bore.

CUTOFF VALVES

The cutoff valves 541 and 542 for the right and left power flow systems are the same as the above described cutoff valves 341 and 342 in FIGURE 8 and the same reference numerals are employed for the valve details. The right delivery line 466 and return line 468 are respectively connected by branches 466' and 468' to right cutoff valve 541 at ports 347 and 348. The left delivery line 491 and return line 492 are respectively connected by branches 491' and 492' to left cutoff valve 542 at ports 347 and 348.

The cutoff valves are pressure relief valves which, when the input speed is normal, are supplied with feed line 516 pressure via line 526, relay valve 535 and line 539 and function to relieve pressure in excess of a high value, i.e., 5000 p.s.i., from either delivery line 466 or return line 468 to the other. During input overspeed, line 539 is exhausted and the cutoff valves provide a throttled connection between the delivery and return lines to reduce the high pressure in one line and provide breaking.

PUMP DISPLACEMENT CONTROL

The pump displacement control system is supplied with high pressure control fluid from the high pressure control fluid supply described below providing a fluid supply from the power system via reduction regulator valve 676 and high control pressure line 683 at pressure proportional to high power system pressure zero to 500 p.s.i., or from the feed line 516, i.e., 150 p.s.i., through the check valve 561 to provide the displacement supply line 562 with a high control pressure, i.e., 150 p.s.i. to 500 p.s.i. The right and left displacement control valves 563 and 564 control respectively the displacement of the right and left pump. Each valve consists of a movable control valve sleeve 566 and a movable valve element 567 having lands $a$ and $b$ of equal diameter located in the sleeve. The right control valve 563 selectively connects the supply line 562 to the increased displacement line 578 or the decreased displacement line 579 for the right pump 457.

The left displacement control valve 564 similarly connects the branch of supply line 562 to the increased displacement line 581 or the decreased displacement line 582 for the left pump 462.

The right pump displacement control mechanism or crank assembly 456 consists of a cylinder 583 having a piston 584 reciprocally mounted therein to vary the eccentricity of the swash plate 586 as shown in detail in FIG. 4, 6 or 7. As pointed out above, the input drive shaft 454 drives the crank assembly 456 to wobble the swash plate 586. The piston 584 has a cam surface 587 engaged by cam follower rod 588 axially mounted on the axis of rotation of the pump, or other suitable linkage mechanism, connected to the valve element 567 to position the valve element in accordance with eccentricity of the piston 584.

The displacement control mechanism 461 of the left pump 462 also consists of a cylinder 591 having a piston 592 reciprocally mounted therein. The input drive shaft and gears 459, 460 and 460' rotatably drive the crank assembly 461 to wobble the swash plate 593 to drive the pump. The piston 592 has a cam surface 594 cooperating with a cam follower rod 596 which is connected to the valve element 567 of the left control valve 564 to position the valve element in accordance with the position or eccentricity of the piston 592.

PUMP DISPLACEMENT DRIVE AND STEER CONTROL

The control ring 601 has a right trunnion 602 connected by a suitable pivot or ball joint to the control sleeve 566 of right displacement valve 563, and a left trunnion 603 connected by a ball joint to the control sleeve 566 of the left control valve 564. A shaft 606 secured to and extending from the control ring 601 on an axis at right angles to the axis of trunnions 602 and 603, is pivotally mounted by a ball pivot 607 in a portion of the frame 608 and has at its upper end a steering handle 609 which may be moved toward the right, as indicated by the arrow RT, for a right turn, and toward the left as indicated by the arrow LT for left turn.

The displacement control lever 611 is pivotally mounted by a pivot 612 to the support 608 at a point intermediate its length, and at the other end pivotally connected to rod 614, which is pivoted to the control ring 601 diametrically opposite and coaxial with the axis of the steering control shaft 606.

In order to prevent engine overspeed, the governor line 532 is connected to an actuator 616 having a piston 617 normally biased by a spring 618 to the inoperative position shown, and connected by a lost motion link 619 to the lever 614. Exhaust 620 drains the spring chamber. Governor pressure in line 532 indicating the presence of an overspeed condition will move piston 617 against biasing spring 618 to move the lever 611 in the more displacement direction indicated by the arrow MD. The lost motion link 619 permits limited free manual control. Movement of the displacement lever 611 in the more displacement direction, indicated by the arrow MD, will move the lower portion of ring 601 to the right and move both control sleeves 566 to the right to connect line 562 to the right more displacement line 578 and the left more displacement line 582 to increase the displacement of both right and left pumps 457 and 462. Similarly, the movement of lever 611 in the less displacement direction, indicated by the arrow LD, will move the control sleeves 566 for both valves to the left to connect line 562 to the less displacement lines 579 and 582 to decrease displacement of the pumps 457 and 462. During this operation to provide more or less displacement, the cam followers will operate to close the displacement valves when the degree of displacement called for by lever 611 is obtained so that the degree of increased or decreased displacement is proportional to the degree of movement of the displacement lever 611. Thus each lever position provides a predetermined displacement.

Movement of the handle 609 for right turn rotates the right 601 counterclockwise as viewed from the top, moving the control sleeve 566 of the right displacement valve 563 away from the pump unit 457 to connect supply line 562 to the decreased displacement line 579 for the right pump wihch will move the piston 584 to a decreased displacement position. Then the cam 587 will move the cam follower 588 and valve element 567 to the left to cut off the flow and hold the less displacement position. Also, on movement for right steering of the handle 609, the left control sleeve 566 of valve 564 is moved to the right connecting the line 562 to the left pump more displacement line 582. This increased displacement movement of the piston 592 will act through the cam 594 to move the follower 596 to the left and move valve 564 to the closed position. Thus movement to the steering control for right movement will, proportional to the degree of movement of the handle, increase the displacement of the right pump 457 and decrease the displacement of the left pump 462 for infinitely variable steering control.

MOTOR DISPLACEMENT CONTROL

The right motor displacement regulator valve 631 has a valve element 632 having lands $a$, $b$ and $c$ of equal diameter located in a valve bore 633 of uniform diameter. With the valve element 632 in the central position shown, land $b$ blocks the control fluid supply line 562, the increased displacement line 634 is blocked between the lands $b$ and $c$ while the decreased displacement line 636 is blocked between lands $a$ and $b$. The valve element 632 is biased in the decreased displacement direction by spring 637 and is biased in the increased displacement direction by the control pressure supplied by line 638 to the chamber 639 where it acts on a small diameter land $d$ of the valve element 632. Land $d$ may be a separate plug. The exhaust 641 drains the spring chamber and the exhaust 642 drains the bore between the lands $c$ and $d$. The supply line 477 to the motor 478 is connected by branch line 477' and one-way check valve 643 to the control line 638. The return line 486 is similarly connected by branch line 486' and one-way check valve 644, to the control line 638 in order to supply to the control line 638 the higher of the pressures in lines 477 and 486. With the valve in neutral position, as shown above, the supply line 562 and the increased and decreased displacement lines 634 and 636 are blocked to maintain motor displacement unchanged. When the pressure supplied to the motor decreases below a predetermined middle value, i.e., 1500 p.s.i., this pressure in line 638 permits the biasing spring 637 to move the valve element 632 to the left connecting the supply line 562 to the decreased displacement line 636 to decrease motor displacement. Similarly, a high pressure in right motor supply or exhaust line provides a high pressure and a higher pressure in line 638 which would move the valve element 633 against the biasing force of spring 637 to connect the supply line 562 to the increased displacement line 634 to increase motor displacement. The displacement control unit 481 of right motor 478 has a piston 647 located in a cylinder 648 with the increase displacement line 634 connected to the increased displacement chamber of the motor and a decreased displacement line 636 connected to the decreased displacement chamber of the cylinder 648. The increase and decrease displacement chambers of cylinder 648 are connected by restricted lubrication passages like, passages 119 and 120, FIG. 4, for continuous exhaust. When the motor displacement valve 631 selectively supplies fluid under pressure via one of the less restricted increase and decrease displacement lines 634 and 636 to the corresponding chamber, the corresponding chamber will be pressurized since the exhaust is more restricted than the inlet and the other chamber is exhausted by the lubrication line. Motor displacement valve 631 may also be provided with exhausts like exhausts 403 and 404 of motor displacemen valve 396, FIG. 8. The increase and decrease displacement lines are preferably restricted to damp the displacement regulating action.

The left displacement control valve 651 is similar to the right displacement valve and has a valve element 652 having lands $a$, $b$ and $c$ of equal diameter located in a bore 653 and a land $e$ of smaller diameter located in a smaller bore portion 654. There is a spring chamber exhaust 656 and exhaust 658 between the lands $c$ and $e$. The increased displacement line 661 and the decreased displacement line 660 which may both be restricted connect the valve to the increased and decreased chambers of the cylinder 662 to actuate the piston 663 of the left motor control unit 499. The left motor supply line 496 has a branch 496' connected through a check valve 664 to the left control line 665 and the return line 504 has a branch 504' connected through a check valve 666 to the left control line 665 so that the higher of the pressures in the supply and exhaust lines are connected to the control line 665 to actuate the displacement regulator valve 651.

The left motor displacement valve 651 in neutral position similarly blocks the supply line 562 and the increased and decreased displacement lines 661 and 660. When the control pressure in control line 665 is higher than the normal regulated pressure, i.e., 1500 p.s.i., it moves the valve against the biasing spring to connect the supply line 562 to the increased displacement line 661. Conversely, when the pressure supplied to the pump is lower than normal, the spring 653' overcomes the pressure in control line 665 moving the valve 652 to the left connecting the supply line 562 to the decreased displacement line 660. The left cank assembly 499 has lubricating passages to exhaust the chambers in cylinder 662 as pointed out above for the right unit 481.

HIGH PRESSURE CONTROL FLUID SUPPLY

The right control line 638 is connected through a one-way check valve 671 to the control line 672 and the left control line 665 is similarly connected through one-way check valve 673 to the control line 672, to provide a pressure in control line 672 equal to the highest of the pressures in the supply and exhaust lines connected to both motors.

The control feed line 672 is connected by the regulator valve 676 to the suppply line 562 to provide a pressure in the supply line 562 approximately one-tenth the power circuit pressure supplied to the motors with a minimum pressure of 150 p.s.i. from valve 561. The reducing regulator valve 676 has a valve element 677 having lands $a$, $b$ and $c$ located in a bore 678 having a reduced diameter portion 679 for the smaller land $c$ which may be a separate piece. The control feed line 672 is connected at port 681 to act on the small land $c$ and to regulating port 682 where the pressure is throttled between the lands $a$ and $b$ to the outlet line 683 to supply fluid to control system supply line 562. The outlet pressure acts on the balanced areas between lands $a$ and $b$ and is connected to chamber 684 to act on the unbalanced area of land $a$ biasing the valve to closed position blocking flow from line 672 at port 682. Exhaust 685 provides a vent between lands $b$ and $c$. Since this area is larger, i.e., 10 times the area of land $c$ biasing the valve to the opened position connecting line 672 to line 683, the valve supplies about one-tenth the pressure of line 672 to line 683.

OPERATION—FIGURE 9

The arrangement of the power flow circuit including the pumps, motors and reversing valve and connecting lines is similar to FIGURE 8 and pnovides either forward or reverse drive and a positive neutral. The right and left circuit may be selectively operated for infinitely variable steering. In the right power circuit, when the reversing valve 467 is in the forward position shown, the pump 457 is connected by the delivery line 466 through the valve and supply line 477 to the motor. The return flow from the motor passes through exhaust line 486, the valve 467 and return line 468 to the pump. In reverse drive the reversing valve 467 in the reverse position connects the delivery line 466 to the exhaust line 486 to deliver the fluid in a reverse direction through the motor 478 and the low pressure return is connected by supply line 477 the reversing valve and return line 468 to the pump. In neutral all lines are interconnected at the reversing valve 467 to unload the pump and permit the motor to free wheel. The left reversing valve 493 controls the power circuit between the left pump 462 and motor 497 in the same manner. In the forward position shown, the delivery line 491 is connected by the valve to the supply line 496 and fluid returned by exhaust line 504, the valve and return line 492. The fluid supply system supplied via feed line 516 a moderate pressure, i.e., 150 p.s.i., through the check valved lines 521 and 524 to each of the return and delivery lines to, under normal driving conditions, supply makeup fluid to return lines 468 and 492, and under overrun conditions to the delivery lines 466 and 491.

The displacement of the pumps is controlled by the lever 611 and the engine overload inhibitor or actuator 616 which functions in response to governor pressure increasing in proportion to engine speed to permit a predetermined proportional manually controlled increase in displacement in accordance with engine speed. The actuator 616 due to the size of the cylinder and piston therein will move the lever and act as a hydraulic detent, but a harder than normal manual force applied to the lever 611 will overcome the actuator 616 permitting higher pump displacement and lugging of the engine if the operator desires this condition. The lever 611 acts through the control ring 601 to actuate the pump displacement valves 563 and 564 to control the pump displacement, as explained in detail above, to control the volume of fluid pumped through the power circuit.

The motor displacement control for each motor is controlled by the higher pressure in either the supply or exhaust line to that motor. Thus for the right motor the supply line 477 and the exhaust line 486 are respectively connected through lines 477' and 486' and check valves 643 and 644 to the line 638 to connect the higher of these pressures to act on the right motor displacement valve 631 to reduce the motor displacement whenever the high power circuit pressure is reduced below a predetermined high pressure value, i.e., 1000 p.s.i., and to progressively reduce the motor displacement to maintain this pressure.

The higher of the two control pressures employed to control the right and the left motor displacement valves 631 and 651 is selected by the check valves 671 and 673 to supply the control feed line 672, which is connected by the regulator valve 676 to supply the displacement control supply line 562 with a reduced pressure, i.e., one-tenth, proportional to the highest pressure supplied to either of these motors. Thus the control pressure supplied to the pumps and motors to actuate the displacement control system thereof is supplied with a pressure proportional to the power requirements of the control system. The supply from feed line 516 to check valve 561 prevents reduction of this displacement supply line pressure in line 562 below a moderate valve, i.e., 150 p.s.i.

Figure 13:
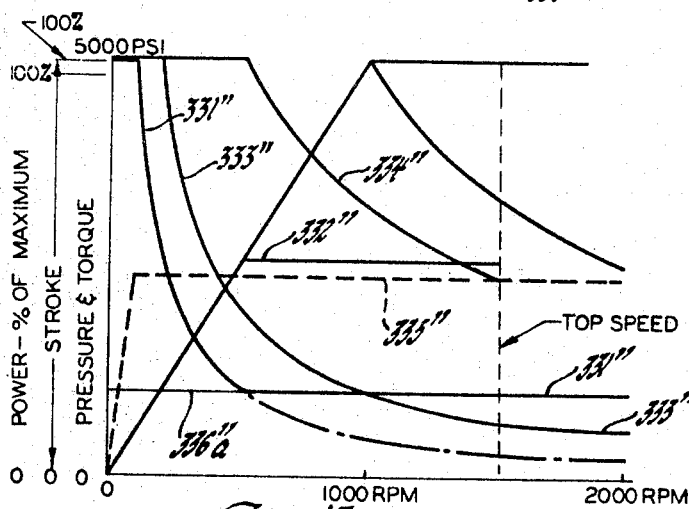
FIGURE 13 shows the operating curves for the hydrostatic transmission shown in FIGURE 10 at half power.

At full power, the pump and motor displacement curves, the torque pressure curves are the same as for the transmission system in FIGURE 8 shown in FIGURE 11. Since the pump displacement control is not connected to affect the motor displacement valve, the minimum pressure obtained in the system would be a constant medium value, i.e., 1000 p.s.i., and indicated by the curve 336a in FIGURE 11. The operating curves of the FIGURE 9 control system operating at half power are shown in FIGURE 13. When operating on the half power curve 335", the power system pressure as indicated by curve 331" will initially rise to the maximum of 5000 p.s.i. as limited by the cutoff valves 541 and 542 and then drop quickly with decreasing torque ratio as indicated by the pressure curve 331" and providing torque as shown by the torque curve 333". When the pressure curve 331" meets the minimum pressure curve 336"a, the motor displacement valves 631 and 651 start to reduce the motor stroke as indicated by the curve 334", and the pump stroke as shown by curve 332" is limited to a mean value in this, i.e., 60% and the power system pressure indicated by curve 331" is limited to a minimum high operating pressure value, i.e., 1000 p.s.i. At half power, the curves terminate at the top speed line since the transmission would not be able to drive the load or vehicle over three-fourths maximum speed.

On engine overrun, in addition to the normal engine braking, hydraulic braking is also provided. Since the pressurized return line, i.e., the right return line 468, is connected by line 468' to the cutoff valve 541 which throttles and releases the high pressure via branch 466' to the low pressure delivery line 466. During overrun, if the engine should overspeed, the high governor pressure supplied by line 532 to the relay valve 535 exhausts the control pressure in line 539 from the cutoff valves to immediately cause the cutoff valves to throttle fluid flow from the high pressure line to the low pressure line, i.e., return line 468 via branch 468' to the lower pressure branch 466' and delivery line 466 to provide hydraulic braking to reduce the engine speed. The left power circuit is controlled in the same way by the left cutoff valve.

Since the controlled regulation of the pump displacement provides an infinitely variable change in torque multiplication, the pump may be selectively controlled to provide variable displacement and thus variable torque multiplication of the right and left power circuits by rotating the steering lever 609 for either right or left steer to respectively increase the displacement of one pump and reduce the displacement of the other pump to provide a steer effect of an infinitely variable type.

MODIFIED CONTROL SYSTEM—FIGURE 10

*Pump, motors and power flow system*

Figure 10:
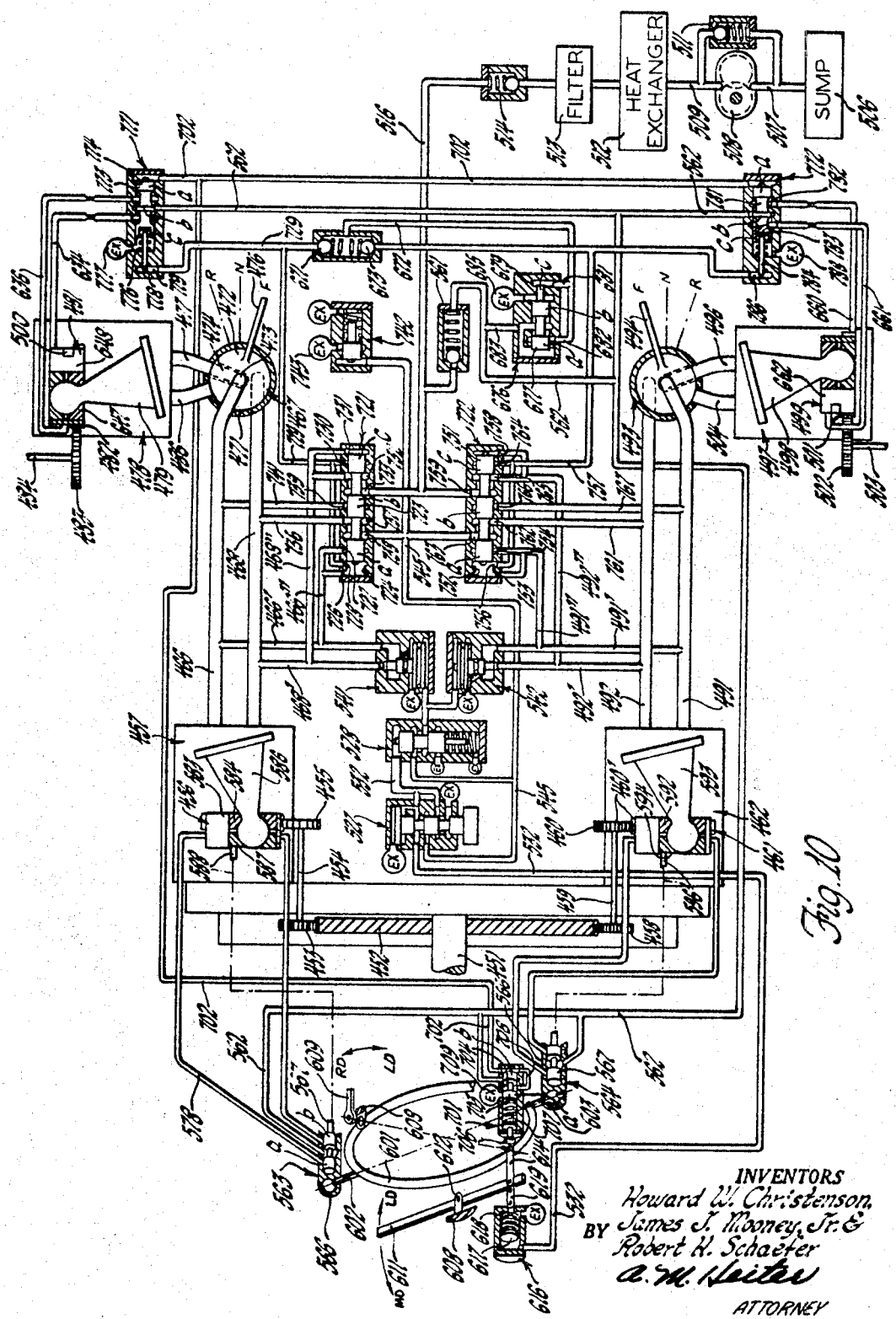

A modified control system illustrated in FIGURE 10 is employed in conjunction with the same arrangement of drive pumps, power transmitting circuits, and motors to provide a hydrostatic transmission. The components of this hydrostatic transmission and control system which were previously employed in the hydrostatic transmission shown in FIGURE 9 and described in detail above have like reference numerals. As in FIGURE 9, the engine drives the input shaft 451 which is connected by the gearing to drive the displacement control unit or crank assembly 456 driving the right pump 457 and the displacement control unit or crank assembly 461 driving a left pump 462. The right pump delivers fluid to a delivery line 466 and has a return line 468 connected by reversing valve 467 and the right motor supply line 477 and exhaust line 486 to the right motor 478. The right motor drives through the displacement control unit 481, the right output shaft 484. The left pump has a delivery line 491 and a return line 492 connected by the left reversing valve 493 and the motor supply line 496 and motor return line 504 to drive the left motor 497. The left motor is connected by the displacement control unit 499 to drive he left output shaft 503.

CONTROL AND MAKEUP FLUID SUPPLY

The control system in FIGURE 10 also employs, as shown and described above in conjunction with FIGURE 9, a similar fluid supply having a sump 506 and a pump 508 which supplies fluid to the makeup, cooling and control system through the heat exchanger 512, filter 513, and check valve 514 to the feed line 516. The feed line is similarly connected through a check valve 561 to supply fluid to the displacement control supply line 562, at a low pressure, i.e., 250 p.s.i., when pumps 457 and 462 are at such a low pressure, i.e., below 2500 p.s.i., that the normal supply by regulator valve 676 of the high pressure displacement fluid supply via line 683 as explained above is below this low pressure, i.e., 250 p.s.i. Fluid is also supplied from the power transmitting circuits as will be explained below to the check valves 671 and 673 which permit flow to line 672 and the regulator valve 676 which reduces the pressure approximately one-tenth and delivers a pressure varying with drive pump output pressure to the control supply line 562 and closes check valve 561 in the same manner as described above in conjunction with FIGURE 9.

GOVERNOR, RELAY AND CUTOFF VALVES

The input shaft 451 drives a governor 527 which is fed by constant pressure line 545 and supplies a governor pressure proportional to engine speed to line 532 to control the relay valve 528 which supplies a signal pressure from the constant pressure line 545 to the cutoff valves 541 and 542. The structure of these valves and their operation is the same as described above and shown in FIGURE 9 except that the fluid supply provided by the constant pressure line 545 is derived from the power flow system as explained below in the description of the cooling valves 721 and 722 instead of by feed line 516–526 in FIG. 9. The cutoff valves as shown in FIG. 10 are the same as shown in FIGS. 8 and 9 and are connected to the pump delivery and return lines as in FIG. 9 and operate to limit the pressure in these lines as described above in conjunction with FIG. 9.

PUMP DISPLACEMENT CONTROL

The pump displacement control valves 563 and 564 and the pump displacement control or crank assemblies 456 and 461 are the same as described above and shown in FIG. 9.

PUMP DISPLACEMENT DRIVE AND STEER CONTROL

A similar steering level 609 is employed to rotate the control ring 601 to control the right and left pump displacement valves 563 and 564. The displacement control lever 611 also controls the displacement control ring 601 to simultaneously control the displacement valves 563 and 564. The speed inhibitor 616 limits movement of the displacement lever in an increased displacement direction in response to low engine speed to prevent overloading and stalling of the engine driving the pumps 457 and 462. These displacement controls for the drive pumps are the same and operate in the manner described above and shown in FIGURE 9.

FIGURE 10 shows in addition a displacement or ratio demand of valve 701 controlled by the displacement control lever 611 to provide a pressure in the control line 702 proportional to the position of the displacement lever. The valve 701 has a valve element 703 having lands $a$ and $b$ of equal diameter located in a bore 704. The displacement control lever 611 is arranged to actuate a plunger 706 which engages a spring 707 to increase the biasing force of the spring acting on the valve element 703 with increasing displacement movement of the lever 611. The control supply line 562 is connected to the valve bore 704 between the lands $a$ and $b$ to the branch 708 of the line 702. The branch 708 is connected through the closed end of the bore 704 adjacent the unbalanced area of land $b$ so that the displacement pressure acts on the valve element 703 to oppose the biasing force of spring 707 to regulate the pressure in line 702 in accordance with the position of the displacement control lever 611. On movement of lever 611 to a less displacement position LD, the excess pressure in line 702 acts on the valve element 703 to move it against the spring force to block the supply line 562 and open the branch line 708 to exhaust 709. The valve 701 preferably provides zero pressure when the displacement control lever 611 is in the zero displacement position and increasing pressure as the displacement lever is moved to provide increasing displacement. At a point between three-fourths full and full displacement, the displacement pressure should reach a maximum and thereafter be constant.

COOLING FLUID SUPPLY VALVES

The right and left cooling fluid supply valves 721 and 722 (FIG. 10) are similar to cooling valves 351 and 352 (FIG. 8) and control the supply of fluid to and the exhaust of fluid from the respective right and left power transmitting circuit in order to provide a predetermined volume of fluid continuously passing through the heat exchanger. The right cooling valve 721 has a valve element 723 having lands $a$, $b$ and $c$ of equal diameter located in a bore 724 having closed ends. The high pressure fluid delivered by the right pump during normal forward driving operation through delivery line 466 is connected by branch 466' and 466" to the port 726 at the left end of bore 724 to act on the land $a$ of element 723, move the valve to the normal forward drive position shown. Delivery branch line 466" is also connected to port 727 which is blocked by land $a$. Port 728 is uncovered by land $a$ in this position and connects delivery branch line 466" to the right pressure control line 729 to provide a control pressure to the system for motor displacement control which is the same as the right pump motor supply pressure. The return line 468 is connected by branch 468' and 468" to port 731 at the opposite end of bore 724 and acts on land $c$. Since the return pressure is less than the delivery pressure during drive the valve maintains the position shown. The branch 468" is also connected to the port 732 which, in the drive position of the valve, is located between the lands $b$ and $c$. Feed line 516 is connected via port 733 to the space between the lands $b$ and $c$, and port 732 to branch 468" to supply cooling and makeup fluid to the return line 468 at the intake of pump 457. Fluid is exhausted from the return line 468 via the branch 736 which is located further from the pump than branch 468' to exhaust fluid from the pump return line 468 to port 737 through the space between lands $a$ and $b$ to port 738 to the low pressure line 545 which is maintained at a low pressure, i.e., 150 p.s.i., by the relief valve 742 and the excess returns via exhaust 743 to sump 506. Branch line 741 of delivery line 466 is blocked by land $b$ of valve element 723 of valve 721.

When the vehicle overruns the engine, the pressure in return line 468 is higher than the pressure in the supply line 466. Then the pressure in branch 468" connected to the right by port 731 at the right end of bore 724 acts on the unbalanced area of land $c$ to overcome the lower pressure in line 466 and branch 466" which is connected by port 726 to act on the unbalanced area of land $a$ to move valve element 723 to the left into the overrun position. With the valve element 723 in overrun position, the higher pressure in the return line 468 is connected by branch 468" and port 731 to port 730 to supply control line 729 to supply control fluid to the right displacement control valve. The high return pressure in branch 468" at port 732 is blocked by land $c$. The feed line 516 supplies a high control pressure, i.e., 250 p.s.i., via port 733 between the lands $b$ and $c$ to port 739 and line 741 supplies fluid to the delivery line 466 now at a lower pressure due to the pumping action of the motor. The fluid is exhausted from the delivery line 466 adjacent the motor via branch 466''', port 727, the space between lands $a$ and $b$, port 738, to control line 545 and exhaust at relief valve 742.

The left cooling valve 722, like the right cooling valve 721, has a valve element 751 having lands $a$, $b$ and $c$ located in a bore 752 closed at both ends. During driving operation the higher pressure in delivery line 491 is conducted by branches 491' and 491" to the port 753 at the left end of the bore 752 to move the valve element to the drive position shown. In this position the land $a$ blocks the port 754 of branch line 491" and connects the port 756 to supply delivery pressure via branch 491" to the left control feed line 757. The low pressure supplied by branch 492", port 758 at the right end of the bore acting on land $c$ is insufficient to move the valve. The main feed line 516 is connected by port 759 between the lands $b$ and $c$ to the branch 492" to supply the return line 492 closely adjacent the pump intake. The return line 492 is exhausted further from the pump intake by the branch 761 which is connected to the port 762 between the lands $a$ and $b$ to port 763 and low pressure line 545.

On vehicle overrun, though the flow in the delivery and return lines remains in the same direction, the pressures are reversed. With the higher pressure in the return line 492 on overrun, this pressure is conducted by branch 492" to port 758 to act on the land $c$ of valve element 751 to move the valve from the position shown to the left to the overrun position. In this position, the high pressure from return line 492 at port 758 is connected through the valve bore to port 764 and left control line 757. Land $c$ blocks the port 765 of high pressure branch line 492". Branch line 761 is blocked at port 762 by land $b$. The supply line 516 is connected via port 759 between the lands $b$ and $c$, port 766 and line 767 to supply fluid to the delivery line 491 near the motor 497 which is now acting as a pump so that the supply is to the low pressure delivery line near the pump intake. The exhaust from the delivery line 491 is further from the motor inlet with the motor acting as a pump and is conducted via branch 491'–491", port 754 between the lands $a$ and $b$ to port 763 and low pressure line 545.

MOTOR DISPLACEMENT CONTROL

The right motor displacement valve 771 and the left motor displacement valve 772 respectively control the displacement of the right and left motors 478 and 497. The right motor displacement valve 771 has a valve element 773 having lands $a$, $b$ and $c$ located in a bore 774. A spring 776 located in a spring chamber vented by exhaust 777 biases the valve element in one direction. A piston 778 has one end located in a chamber 779 connected to the right control pressure line 729 and the other end engaging the valve element to bias the valve in the same direction with a force proportional to the higher pressure in the power system. Displacement line 702 is connected to the other end of the closed bore 774 to act in the opposite direction on the unbalanced area of land $a$.

The right motor displacement control valve 771 controls the supply of fluid from the displacement control supply line 562 to the right motor increase displacement line 634 and decrease displacement line 636 as explained above for displacement control valve 631, FIGURE 9. In the neutral position shown, flow from supply line 562 is blocked by land $b$ and the chambers in cylinder 648 are connected through lubrication lines to exhaust. When the spring and higher pressure in the power flow circuit supplied by control and feed line 729 prevails to move the valve to the right, the displacement control pressure line 562 is connected to the increased displacement line 634 to increase the displacement of the right motor. When the displacement pressure in line 702 overcomes the high system pressure line 729 and spring moving valve element 773 to the left, the control pressure line 562 is connected to the decreased displacement line 636 to decrease the motor displacement.

The left motor displacement valve 772 is like the right motor displacement valve 771 and has a valve element 781 having equal lands $a$, $b$ and $c$ located in a bore 782 closed at one end which is supplied with torque demand pressure by line 702 to act on the land $a$. A spring 783 located in a spring chamber having an exhaust 788 acts on a valve together with a plunger 784 urged by the higher pressure in the right power system supplied by line 757 to chamber 786. The right pressure and the spring biases valve element 781 in a direction to connect supply line 562 to the increased displacement line 761 for the left motor. The displacement pressure biases the valve in the opposite direction to connect supply line 562 to the decreased displacement line 660 to decrease the left motor displacement.

DISPLACEMENT CONTROL OPERATION

The right motor displacement control valve 771 automatically controls the displacement of the right motor 478. With the displacement control lever in zero displacement position, the pumps will not be pumping and the vehicle will normally be at rest. Under these conditions, no pressure is supplied to the delivery line 466 and via the cooling valve 721 to the control pressure line 729 or to control line 702. With both control pressures at zero, the spring 776 moves the displacement control valve 771 to the increased displacement position connecting the control feed supply line 562 to the increased displacement line 634 to increase the motor displacement to a maximum.

With the engine running, moving the displacement control lever 611 in a more displacement direction to start the vehicle, increases the pressure in the delivery line 446 to a pressure value proportional to the torque transmitted above a minimum pressure determined by the motor displacement control. On overrun, the load drives the motor as a pump to provide a higher pressure in return line 468. The higher of these two pressures in either the delivery line 466 or the return line 468 will be connected by the cooling valve 721 to the control line 729 and chamber 779 to act on the plunger 778 and urge the valve element 773 in the increased displacement direction. Also moving the displacement control lever 611 in an increased displacement direction will actuate the displacement pressure valve 701 to provide a proportionately increasing pressure in line 702 which will act on the large area of the opposite end of valve element 773 in opposition to the biasing force of the spring and the higher power circuit pressure on the small plunger 778.

The left motor displacement control valve 772 is connected to left power circuit pressure and displacement pressure in the same manner and both function the same.

The power circuit pressure, as shown by curve 331, FIG. 11, varies with the torque, curve 333, above a minimum constant value determined by the motor displacement control. The displacement pressure varies in proportion to pump displacement from zero to full displacement and is proportional to curve 336. The area of plunger 778–784 acted on by displacement pressure and the area of valve element 773–781 are so proportioned that these pressures and the biasing force of the spring hold valve element 773 in the more displacement position holding the motor at full displacement, curve 334, whenever the power circuit pressure curve 331 is higher than the minimum power circuit pressure curve 336.

As pointed out above, regarding the FIG. 8 system, the spring value may be changed to provide minimum pressure curve 336$b$.

When the power circuit pressure tends to be lower than this value, the displacement pressure overcomes power circuit pressure and moves the motor displacement valve element 773 to the less displacement position to reduce the motor displacement, as shown by curve 334, to the degree necessary to maintain the constant minimum power circuit pressure and good efficiency. It will be noted that torque multiplication curve 333 continues to reduce with increasing speed.

Operation at full engine power for preferred embodiment is shown by the curves in FIG. 11. The pump displacement curve 332 is full at and above half engine speed, and power circuit pressure, curve 331, is the same as minimum power circuit pressure, curve 336, and motor displacement is reduced, curve 334.

Operation at partial engine power conditions is illustrated by the curves for one-half engine power, FIG. 12. At about three-fourths the pump stroke, the power circuit pressure, curve 331', tends to drop below minimum power circuit pressure, curve 336', and thus the motor stroke, curve 334', is reduced to thereafter maintain power circuit pressure, curve 331', at a constant value, i.e., 750 p.s.i. The pump displacement, curve 332, is maintained at about three-fourths the pump stroke, by the engine overload inhibitor or actuator 616. Motor displacement reduction is limited by a stop 500 at a mean value, i.e., 50%, which would occur at the top speed at one-half power.

HIGH PRESSURE CONTROL FLUID SUPPLY

The higher pressure in each of the right and left power flow circuits is connected by the right and left cooling valves 721 and 722 to the right and left pressure control and feed lines 729 and 757, respectively.

As explained above, the control and feed lines 729 and 757 are connected through check valves 671 and 673, respectively, to line 672 which is connected to the pressure reduction valve 676 described in detail above and also shown in FIG. 9, which reduces the higher system pressure, i.e., one-tenth to supply a pressure to outlet 683 and the displacement control ilne 562 proportional to system pressure. Since feed line 516 is also connected via check valve 561 to displacement control line 562, the displacement control pressure is one-tenth of the high control or power system pressure with a low limit equal to the low control pressure, i.e., 150 p.s.i. to 500 p.s.i.

OPERATION—FIGURE 10

The arrangement of the power flow circuit including the pump motors and reversing valves and the connecting lines is similar to FIGURES 8 and 9 and provides either forward or reverse drive, a positive neutral and selective control for drive brake or pivot steering.

The power circuit makeup and cooling fluid supply is connected to the return and delivery line, i.e., for the right circuit, delivery line 466 and return line 468, and thus differs from the control system in FIGURE 8 where the cooling and makeup fluid is connected to the supply and exhaust lines, but otherwise the system is substantially similar and functions in a similar manner to withdraw oil or operating fluid from one of the delivery and return lines having the lower pressure at a point spaced from the pump intake or inlet and to supply cooled fluid to this line at a point nearer the pump inlet.

The cutoff valves 541 and 542 function as described above and during engine overrun provide additional hydraulic braking by bleeding fluid from the high pressure line to the low pressure line of the power circuit through the throttling effect of the valve. This valve also operates in conjunction with the governor system in response to a governor overspeed signal indicating engine overspeed to open the cutoff valve to bypass fluid through the throttling passage of this valve from the high pressure to the low pressure line of the power circuit to provide additional hydraulic braking to reduce the engine speed to a proper value.

The pump displacement controls are actuated by lever 611 for uniform displacement of both pumps. The steering control is affected by the steering lever 609 for selective operation of the displacement control of the pumps in the same manner as described above for the FIGURE 9 system. The FIGURE 10 system adds to the control features of the FIGURE 9 system, the displacement valve 701 which provides a signal pressure in line 702 proportional to the position of the displacement lever 611 and thus proportional to pump displacement.

This displacement ratio demand signal pressure is employed in conjunction with the motor displacement valves 771 and 772 to provide in the lower displacement range a minimum system pressure which gradually increases to a high minimum system pressure as indicated by the curve 336 in FIGURE 11. The fluid pressure supply system and the displacement control pressure regulator valve arrangement and minimum pressure supply system is the same as described above for FIGURE 9.

This transmission control system will operate in the same manner as discussed above with regard to the FIGURES 8 and 9 systems at full power to function as illustrated by the curves in FIGURE 11. At partial power, the FIGURE 10 control system will function as illustrated by the curves in FIGURE 12 for a partial power, i.e., half power, as described above in connection with the control system of FIGURE 8.

The above preferred embodiments are illustrative of the invention and it will be appreciated that they may be modified within the scope of the appended claims.

I claim:

1. In a hydraulic transmission, an input driven variable displacement pump having a fluid inlet and a fluid outlet and fluid actuated displacement control means, an output driving variable displacement motor having a fluid inlet and a fluid outlet and fluid operated displacement control means, a supply passage connecting said pump outlet to said motor inlet, a return passage connecting said motor outlet to said pump inlet, bypass valve means connecting said supply and return passage normally closed and operative in response to a predetermined maximum pressure in either one of said supply and return passages to connect said passages, and speed responsive means acting on said bypass valve means to vary said predetermined maximum pressure.

2. In a hydraulic transmission, an input driven pump unit having a fluid outlet and a fluid inlet, an output driven motor unit having a fluid inlet and a fluid outlet, a supply passage connecting said pump outlet and said motor inlet, a return passage connecting said motor outlet and said pump inlet, bypass means interconnecting said supply and return passages operative in response to the rotational speed of one of said units to control the flow of fluid between said supply and return passages to control said rotational speed of said one unit.

3. The invention defined in claim 2 and said bypass means being responsive to the input speed of said pump and the pressure in one of said passages and operative in response to a pump speed above a predetermined normal operating value to open said bypass means at a lower pressure to interconnect said supply and return passages.

4. In a hydraulic transmission an input member, an input driven variable displacement pump having a fluid outlet and fluid inlet and displacement control means, an output member, an output driving variable displacement motor having a fluid inlet and a fluid outlet and displacement control means, a supply passage connecting said pump outlet to said motor inlet, a return passage connecting said motor outlet to said pump inlet, signal means operatively connected to one of said members providing a speed signal varying with the speed of said one member, and control means operatively connected to control one of said displacement control means and said signal means to control said one displacement control means.

5. The invention defined in claim 4 and said one displacement control means being said pump displacement control means, and said signal means being responsive to input speed of said pump to limit pump displacement increase to maintain input speed above a predetermined value.

6. In a hydraulic transmission, an input driven variable displacement pump having a fluid inlet and a fluid outlet and normally acting as a pump but on overrun acting as a motor, an output driving variable displacement motor having a fluid inlet and a fluid outlet and normally acting as a motor but on overrun acting as a pump, a supply passage connecting said pump outlet to said motor inlet, a return passage connecting said motor outlet to said pump inlet, a source of fluid under positive pressure, valve means operatively connected to said passages and said source and operative in response to the pressure in the one of said supply and return passages having the higher pressure to exhaust pressure from the other of said supply and return passages at a point remote from the one of both said pump and motor acting as a pump and to connect said source of positive pressure to said other of said supply and return passages at a point close to said one of said pump and motor acting as a pump to supply fluid under positive pressure for charging to said one of said pump and motor acting as a pump.

7. In a hydraulic transmission, an input driven variable displacement pump having a fluid inlet and a fluid outlet and fluid operated displacement control means, an output driving variable displacement motor having a fluid inlet and a fluid outlet and fluid operated displacement control means, a supply passage connecting said pump outlet to said motor inlet, a return passage connecting said motor outlet to said pump inlet, a source of fluid under pressure, means to regulate the pressure of said source at a pressure proportional to the higher of the pressures in said supply and return passages, and displacement control means connecting said source to said pump and motor fluid operated displacement control means to control the displacement of said pump and motor.

8. In a hydraulic transmission, an input driven variable displacement pump having a fluid inlet and a fluid outlet and fluid operated displacement control means, an output driving variable displacement motor having a fluid inlet and a fluid outlet and fluid operated displacement control means, a supply passage connecting said pump outlet to said motor inlet, a return passage connecting said motor outlet to said pump inlet, a source of fluid under pressure, valve means connected to said supply and return passages and having a control line operative to selectively connect the one of said supply and return passages having the higher pressure to said control line and to connect said source to the other of said passages to supply make up fluid, and means to regulate the pressure of said source at a pressure proportional to said control line pressure, and displacement control means connecting said source to said pump and motor fluid operated displacement control means to control the displacement of said pump and motor.

9. In a hydraulic transmission, an input driven variable displacement pump having a fluid inlet and a fluid outlet and displacement control means, an output driving variable displacement motor having a fluid inlet and a fluid outlet and displacement control means, a supply passage connecting said pump outlet to said motor inlet, a return passage connecting said motor outlet to said pump inlet, displacement demand control means connected to said pump and motor displacement control means and the higher pressure passage of said supply and return passage operative in response to increased displacement demand to connect said source to said pump displacement control to increase the displacement of said pump and operative to connect said source to said motor displacement control means to maintain said motor displacement at a high value when said higher pressure is above a predetermined value and to decrease the displacement of said motor to normally maintain said higher pressure substantially at said predetermined value.

10. The invention defined in claim 9 and means to decrease the proportionate increase in displacement of said pump in proportion to the increase in displacement demand operative in response to a reduction in input speed of the pump.

11. The invention defined in claim 9 and means to vary said predetermined pressure value with displacement demand.

12. The invention defined in claim 9 and means to vary said predetermined pressure value with displacement demand above a preset minimum.

13. The invention defined in claim 9 and means to vary said predetermined pressure value with displacement demand from zero to said predetermined minimum.

14. In a hydraulic transmission, an input driven variable displacement pump having a fluid outlet and fluid inlet and displacement control means, an output driving variable displacement motor having a fluid inlet and a fluid outlet and displacement control means, manual control means connected to said pump displacement control means movable from zero to full displacement demand positions to vary the displacement of said pump, a supply passage connecting said pump outlet to said motor inlet, a return passage connecting said motor outlet to said pump inlet, and means responsive to the higher of the fluid pressures in said supply and return passages and said pump displacement control means operatively connected to said motor displacement control means to reduce the displacement of said motor to prevent reduction of the higher of the fluid pressures in said supply and return passages below a predetermined minimum and means to exhaust fluid at a higher pressure point.

15. In a hydraulic transmission, an input driven variable displacement pump having a fluid outlet and fluid inlet and displacement control means, an output driving variable displacement motor having a fluid inlet and a fluid outlet and displacement control means, manual control means connected to said pump displacement control means movable from zero to full displacement demand positions to vary the displacement of said pump, overcontrol means responsive to the input speed of said pump connected to said pump displacement control means operative to reduce the displacement of said pump in response to a reduction of input speed below a predetermined minimum operating value, a supply passage connecting said pump outlet to said motor inlet, a return passage connecting said motor outlet to said pump inlet, a valve interconnecting said supply and return passages normally closed and operative to interconnect said supply and return passages, and means responsive to the input speed of said pump connected to said valve operative in response to a speed above a predetermined normal operating value to open said valve.

16. In a hydraulic transmission, an input driven variable displacement pump having a fluid outlet and fluid inlet and displacement control means, an output driving variable displacement motor having a fluid inlet and a fluid outlet and displacement control means, manual control means connected to said pump displacement control means movable from zero to full displacemet demand positions to vary the displacement of said pump, overcontrol means responsive to the input speed of said pump connected to said pump displacement control means operative to reduce the displacement of said pump in response to a reduction of input speed below a predetermined minimum operating value, a supply passage connecting said pump outlet to said motor inlet, a return passage connecting said motor outlet to said pump inlet, a relief valve interconnecting said supply and return passages normally closed and operative in response to a predetermined maximum pressure value to interconnect said supply and return passages, and means responsive to the input speed of said pump connected to said relief valve operative in response to a speed above a predetermined normal operating value to open said relief valve at a substantially lower pressure.

17. In a hydraulic transmission, an input driven variable displacement pump having a fluid outlet and fluid inlet and displacement control means, an output driving variable displacement motor having a fluid inlet and a fluid outlet and displacement control means, manual control means connected to said pump displacement control means movable from zero to full displacement demand positions to vary the displacement of said pump, overcontrol means responsive to the input speed of said pump connected to said pump displacement control means operative to reduce the displacement of said pump in response to a reduction of input speed below a predetermined minimum operating value, a supply passage connecting said pump outlet to said motor inlet, a return passage connecting said motor outlet to said pump inlet, a relief valve interconnecting said supply and return passages normally closed and operative in response to a predetermined maximum pressure value to interconnect said supply and return passages, means responsive to the input speed of said pump connected to said relief valve operative in response to a speed above a predetermined normal operating value to open said relief valve at a substantially lower pressure, means responsive to the higher of the fluid pressures in said supply and return passages and said manual control means operatively connected to said motor displacement control means to reduce the displacement of said motor to normally prevent reduction of the higher of the fluid pressures in said supply and return passages below a predetermined minimum and means to exhaust fluid at a higher pressure point and to supply makeup and cooling fluid at a lower pressure point of the one of said supply and return passages having the lower pressure.

18. In a transmission, the combination of a pair of fluid pump and motor units having drive means adapted to be driven by an engine, a pair of driven means each adapted to drive a load, each pump and motor unit having pump means driven by said drive means, motor means driving one of said driven means and power circuit means connecting said pump and motor means of each unit to supply fluid from said pump means to said motor means and return fluid from said motor means to said pump means, and pump displacement varying means to vary the displacement of each of said pump means; displacement control means having controlling means and operatively conected to said pump displacement varying means of each pump means and operative to selectively control the displacement of each of said pump means in response to said controlling means to independently vary the displacement.

19. The invention defined in claim 18 and said displacement control means being operative to vary the displacement of said pair of pump means inversely and coordinately.

20. The invention defined in claim 18 and said displacement control means including a pair of displacement control valves, a control ring connected at opposite sides on one diametral axis to said displacement control valves, means to rotate said control ring about a second diametral axis transverse to said one diameter and means to swing said control ring about a pivot on said second axis to laterally move the control ring at said one diametral axis.

21. The invention defined in claim 4 and said signal means providing a signal proportional to pump speed, said displacement control means being operative in response to said signal to permit variation of said pump displacement varying means to vary the pump displacement in a limited range of pump displacement and said limited range of pump displacement being located at increased displacement values with increasing engine and pump speed.

22. The invention defined in claim 2 and a cooler and said bypass means interconnecting said supply and return passages bypassing at least a portion of the fluid through said cooler.

23. The invention defined in claim 2 and said bypass means interconnecting said supply and return passages throttling the flow to provide braking.

24. The invention defined in claim 2 and said bypass means interconnecting said supply and return passages providing increased cooling above a predetermined speed.

25. In a hydraulic transmission; input driven pump means; motor means driving an output; one of said means having fluid operated displacement varying means; a power circuit interconnecting said pump and motor means; a source of fluid under pressure regulated at a pressure varying with the pressure in said power circuit; and displacement control means connecting said source to said fluid operated displacement varying means to control displacement.

26. In a transmission; the combination of a pair of fluid pump and motor units having drive means adapted to be driven by an engine, a pair of driven means each adapted to drive a load, each pump and motor unit having pump means driven by said drive means, motor means driving one of said driven means and power circuit means connecting said pump and motor means of each unit to supply fluid from said pump means to said motor means and return fluid from said motor means to said pump means, and motor displacement varying means operative to vary the displacement of each of said pump means; displacement control means operatively connected to said motor displacement varying means of each motor means and operative in response to maximum power circuit pressure in either power circuit to control said displacement varying means of both motor means.

27. The invention defined in claim 26 and displacement controlling means operatively connected to said displacement control means to vary the displacement of said motors.

28. The invention defined in claim 26 and pump displacement varying means connected to both of said pump means; displacement controlling means operatively connected to said displacement control means to vary the displacement of said motors and said displacement control means operatively connected to said pump displacement means to vary pump displacement with variation of said controlling means.

29. The invention defined in claim 2 and said bypass means also being operative in response to pressure in one of said passages.

30. The invention defined in claim 29 and said speed responsive means being responsive to pump input speed above a predetermined value to open said bypass valve means at a substantially lower pressure.

31. The invention defined in claim 25 and means to maintain said source of fluid pressure above a minimum value.

32. In a hydraulic transmission; input driven pump means; output driving motor means; each having variable displacement control means; a power circuit connecting said pump and motor means, a displacement demand control movable between a low and a high displacement demand position; controlling means operatively connected to said pump and motor displacement means, said displacement demand control means and said power circuit to control said pump and motor variable displacement control means.

33. The invention defined in claim 32 and said controlling means operating on movement of said displacement demand control from low to high displacement demand acting to increase pump displacement and decrease motor displacement and said power circuit pressure acting with increasing pressure to increase motor displacement.

34. The invention defined in claim 32 and governor means providing a speed signal proportional to pump speed; and said controlling means controlling said pump displacement means in response to said speed signal.

35. In a hydraulic transmission; input driven pump means having variable displacement control means; output driving motor means; a power circuit connecting said pump and motor means, a displacement demand control movable between a low and a high displacement demand position, governor means providing a governor signal proportional to pump speed and controlling means operatively connecting said displacement control means, said displacement demand control and said governor means and operative to control displacement in response to displacement demand and said speed signal.

36. The invention defined in claim 35 and said controlling means increasing the displacement of said displacement control means to the displacement demanded by said displacement demand control at a rate maintaining a substantially constant pump speed.

37. In a hydraulic transmission; input driven pump means; output driving motor means; each having displacement control means; power circuit means connecting said pump and motor means, a displacement demand control movable between a low and a high displacement demand position; and controlling means operatively connected to said pump and motor displacement control means and said displacement demand control and operative to bias said pump displacement control means to increase pump displacement and to bias said motor displacement control means to decrease motor displacement with increasing displacement demand.

38. The invention defined in claim 37 and said controlling means being connected to said power circuit means having a power circuit pressure biasing said motor displacement control means to increase motor displacement with increasing power circuit pressure.

39. The invention defined in claim 18 and each motor means having means to vary the motor displacement and means to prevent decrease of displacement to zero displacement.

40. In a hydraulic transmission; input driven pump means; output driving motor means; each having displacement control means; power circuit means connecting said pump and motor means and controlling means operatively connected to said pump and motor displacement control means to vary pump and motor displacement including means to prevent positioning said motor displacement control means at zero displacement.

41. The invention defined in claim 2 and said bypass means increasing bypass flow in response to a maximum rotation speed of one unit to limit the rotational speed of said one unit to said maximum rotational speed.

42. The invention defined in claim 41 and said one unit being said pump.

43. The invention defined in claim 41 and said bypass means including a bypass valve controlling flow between said supply and return lines and a governor driven by said one unit and controlling said bypass valve.

References Cited by the Examiner

UNITED STATES PATENTS

| | | | |
|---|---|---|---|
| 2,059,155 | 10/1936 | Thoma | 60—53 |
| 2,161,439 | 6/1939 | Thoma | 60—53 |
| 2,232,428 | 2/1941 | Benedek | 60—53 |
| 2,373,226 | 4/1945 | Coates | 60—51 X |
| 2,603,065 | 7/1952 | Sarto | 60—52 |
| 2,931,250 | 4/1960 | Ebert | 74—472.1 X |
| 2,994,233 | 8/1961 | Gerard | 74—472.1 X |
| 3,008,341 | 11/1961 | Cobb | 74—472 |
| 3,021,719 | 2/1962 | Conrad | 74—472 |
| 3,058,297 | 8/1962 | Tolley. | |
| 3,095,757 | 7/1963 | Thoma | 74—687 |
| 3,151,569 | 10/1964 | Muller | 103—173 |
| 3,152,555 | 10/1964 | Pauly | 103—173 |
| 3,163,987 | 1/1965 | Dowty et al. | 60—53 |
| 3,166,891 | 1/1965 | Weisenbach | 60—53 |
| 3,175,354 | 3/1965 | Firth et al. | 60—53 X |

FOREIGN PATENTS 824,279   11/1959   Great Britain.

EDGAR W. GEOGHEGAN, *Primary Examiner.*

DON A. WAITE, *Examiner.*

M. H. FREEMAN, *Assistant Examiner.*